(12) United States Patent  
Ogikubo

(10) Patent No.: US 8,041,194 B2  
(45) Date of Patent: Oct. 18, 2011

(54) DECODE CONTROL APPARATUS, DECODE CONTROL METHOD, COMPUTER PROGRAM, AND RECORDING MEDIUM

(75) Inventor: Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1249 days.

(21) Appl. No.: 11/204,565

(22) Filed: Aug. 16, 2005

(65) Prior Publication Data

US 2006/0039677 A1    Feb. 23, 2006

(30) Foreign Application Priority Data

Aug. 18, 2004   (JP) ................................ 2004-238753

(51) Int. Cl.
  *H04N 5/783* (2006.01)
(52) U.S. Cl. ........................................ 386/347; 386/248
(58) Field of Classification Search .................... 386/46, 386/68, 83, 109, 124, 200, 205, 206, 219–222, 386/239, 248, 343–353; 360/39, 48
  See application file for complete search history.

(56) References Cited

U.S. PATENT DOCUMENTS

| | | | | |
|---|---|---|---|---|
| 5,739,968 A | * | 4/1998 | Inoue et al. ..................... | 360/48 |
| 5,920,675 A | * | 7/1999 | Adolph et al. ................... | 386/68 |
| 6,078,722 A | * | 6/2000 | Kawamura et al. ........... | 386/343 |
| 6,480,664 B1 | * | 11/2002 | Ting et al. ..................... | 386/343 |
| 6,571,052 B1 | * | 5/2003 | Wakimoto et al. ............ | 386/281 |
| 2002/0009287 A1 | * | 1/2002 | Ueda .............................. | 386/68 |
| 2003/0113096 A1 | * | 6/2003 | Taira et al. ..................... | 386/46 |
| 2005/0084012 A1 | * | 4/2005 | Hsu et al. ................. | 375/240.12 |

FOREIGN PATENT DOCUMENTS

| | | |
|---|---|---|
| EP | 1 158 796 | 11/2001 |
| EP | 1 161 097 | 12/2001 |
| JP | 10 322661 | 12/1998 |
| JP | 2002 57986 | 2/2002 |
| JP | 2003 244643 | 8/2003 |
| WO | WO 03 058955 | 7/2003 |

* cited by examiner

*Primary Examiner* — Thai Tran  
*Assistant Examiner* — Mishawn Dunn  
(74) *Attorney, Agent, or Firm* — Frommer Lawrence & Haug LLP; William S. Frommer; Thomas F. Presson

(57) ABSTRACT

A decode control apparatus for decoding encoded data and generating reverse playback image data is provided. The apparatus includes a unit for controlling the reading of the encoded data at a specified playback speed and a unit for generating, from the encoded data read under the control of the read control unit, a plurality of shortened encoded data groups. The apparatus also includes a unit for distributing the plurality of shortened encoded data groups among a plurality of decoders and a unit for generating the reverse playback image data responsive to the specified playback speed, based on decoding the plurality of shortened encoded data groups by the plurality of decoders.

8 Claims, 25 Drawing Sheets

(A) READING AT X1 SPEED (B) DECODING BY FIRST MPEG DECODER (C) REVERSE PLAYBACK

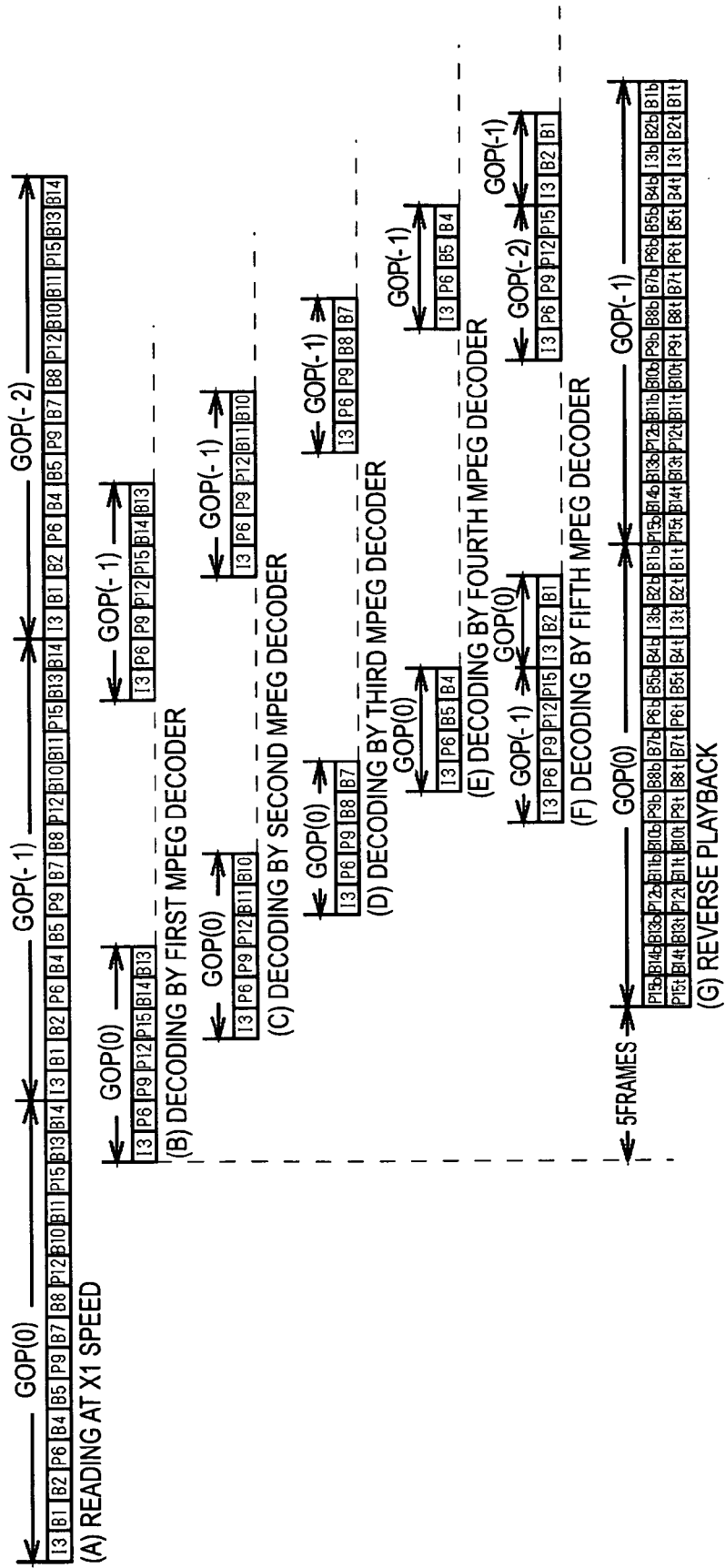

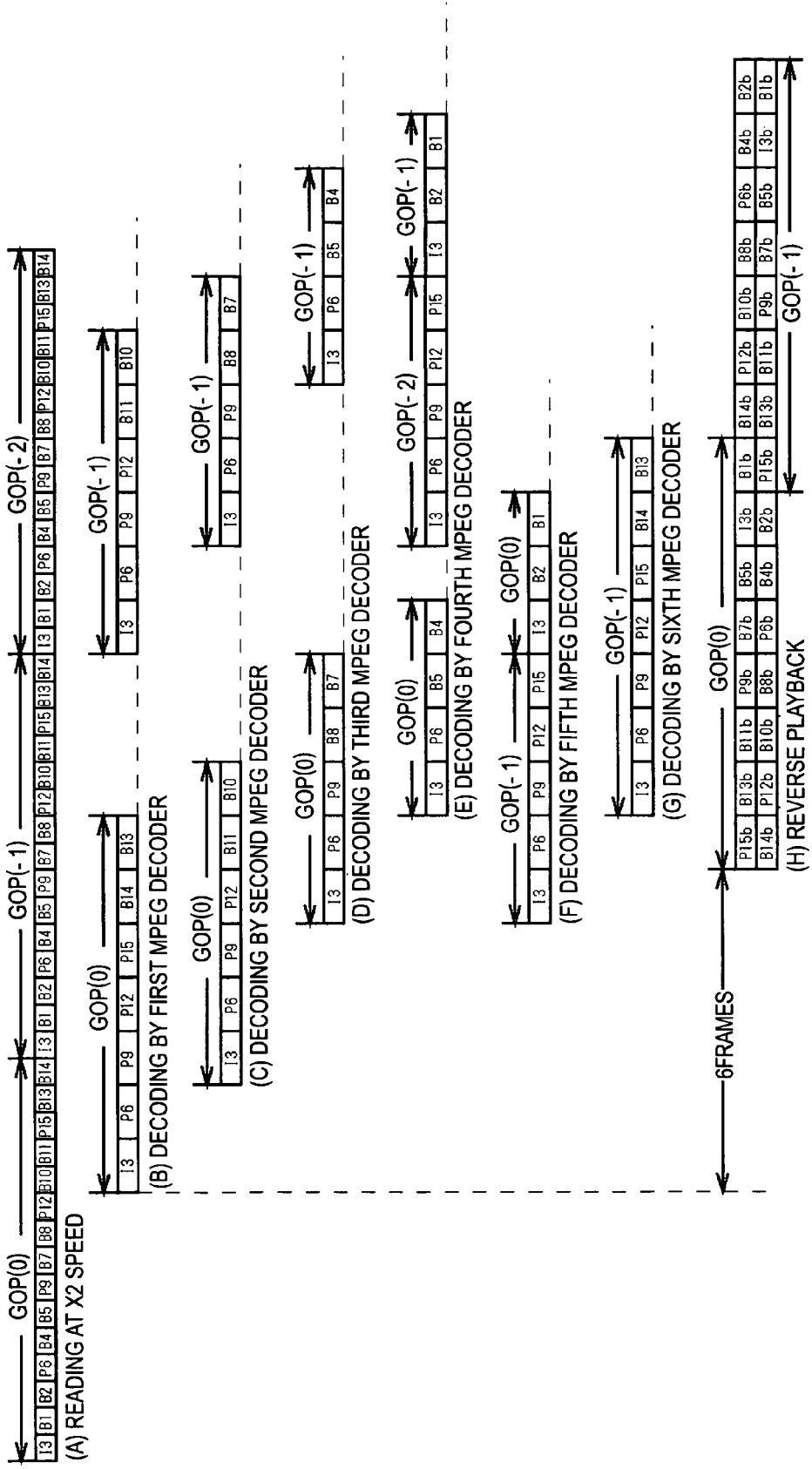

DECODE CONTROL APPARATUS, DECODE CONTROL METHOD, COMPUTER PROGRAM, AND RECORDING MEDIUM

CROSS REFERENCES TO RELATED APPLICATIONS

The present invention contains subject matter related to Japanese Patent Application JP 2004-238753 filed in the Japanese Patent Office on Aug. 18, 2004, the entire contents of which are incorporated herein by reference.

BACKGROUND OF THE INVENTION

1. Field of the Invention

The present invention relates to a decode control apparatus, a decode control method, a computer program and a recording medium, appropriate for reverse playing back a moving picture that is encoded in accordance with moving picture experts group (MPEG) algorithm.

2. Description of the Related Art

MPEG algorithms are available as a method for compressing efficiently moving images. In accordance with the MPEG algorithm, each frame image is successively encoded (compressed) using frame correlation on a per GOP (group of picture) basis. The GOP is composed of a plurality of frames. Each frame is encoded (compressed) into images of one of an I picture, a P picture, and a B picture in accordance with the order within the GOP.

Here, the I picture is an intra-frame image that is encoded within a given frame, and the P picture is an inter-frame forward predictive encoded image that is obtained by predicting a current image based on a preceding I picture or a P picture. The B picture is a bi-directionally encoded picture that is obtained by predicting a current image based on one of the I picture and the P picture preceding in time and one of the I picture and the P picture subsequent in time.

In the discussion that follows, N represents the number of frames contained in 1 GOP, and M represents a period within which one of the I picture and the P picture appears. If the I picture (represented by "I"), the P picture (represented by "P"), and the B picture (represented by "B") are arranged in 1 GOP to be "I, B, B, P, B, B, P, B, B, P, B, B, P, B, B", N is 15, and M is 3.

Since the encoding (compression) process is performed using frame correlation on a per GOP unit basis in the MPEG method, reverse playback process using one MPEG decoder having ×1 speed throughput is subject to limitation. Hereinafter, the MPEG decoder is assumed to have 1× speed throughput. The reverse playback process refers to the operation in which a non-compressed video signal, namely, in a baseband signal state, is played back in a direction in time sequence opposite from the direction at which the video is taken (in the forward direction).

In one of available reverse playback methods, a moving image encoded in accordance with the MPEG algorithm is played back using a single MPEG decoder. In this method, only the I picture is decoded and played back. The reverse playback is possible, but a user is unable to specify a playback speed. The reverse playback operation results in an intermittently moving image rather than a naturally looking smoothly moving image.

In the MPEG algorithm, each frame image is encoded using frame correlation. To decode one of a first P picture and a first B picture other than an I picture, one of a P picture and a B picture, which are referenced to encode the first P picture and the first B picture, need to be decoded beforehand. As a result, a decoding process cannot be completed in time with a single MPEG decoder.

Japanese Unexamined Patent Application Publication No. 2000-175151 disclosed an MPEG decoding technique. According to the disclosure, an I picture and/or a P picture, required to decode a B picture, is decoded in advance and stored in a frame memory. The B picture is then decoded using the I picture and/or the P picture stored in the frame memory. All pictures are decoded at ×1 speed for reverse playback.

With this technique, not only the I picture in 1 GOP but also both the P picture and the B picture are decoded. In comparison with other known techniques that decode and play back only the I picture, the reverse playback operation is smooth.

SUMMARY OF THE INVENTION

In known editing apparatuses, MPEG stream data (shown in apportion (A) of FIG. 26) read on a per GOP basis is decoded in a forward direction by a single MPEG decoder as shown in a portion (B) of FIG. 26, and stored in a memory. The pictures of the decoded GOP are arranged in the reverse order in the memory, and then read. The reverse playback operation is thus performed at ×1 speed as shown in a portion (C) of FIG. 26.

In this arrangement, latency equal to 1 GOP is required from the start of the decoding process of the MPEG decoder to the start of the reverse playback. In other words, a playback delay of 1 GOP occurs, and a frame period of 1 GOP is required. If an editing process is performed on the MPEG stream data, the reverse playback suffers from a delayed response in comparison with normal playback. The delay in response becomes larger as the number of frames N becomes larger as in a long GOP.

It is thus desirable to provide a decode control apparatus, a decode control method, a computer program and a recording medium, appropriate for improving response characteristics in the reverse playback operation performed on encoded data on a per encoding process unit basis, the encoding process unit composed of a plurality of frame images.

In accordance with one embodiment of the present invention, a decode control apparatus for decoding encoded data and generating reverse playback image data, includes a controller for controlling the reading of the encoded data at a specified playback speed, a generator for generating, from the encoded data read under the control of the read controller, an encoded data group composed of a first encoded data unit to be displayed in reverse playback and a second encoded data unit required to decode the first encoded data unit, a distributor for distributing the encoded data group among a plurality of decoders decoding in accordance with the specified playback speed, and a generator for generating the reverse playback image data responsive to the specified playback speed, based on the first encoded data unit, contained in a data group decoded from the encoded data group by the decoders.

The decode control apparatus thus shortens a playback delay from the start of a decoding process of encoded data to the displaying of a playback image, and improves response characteristic in the reverse playback operation of the encoded data arranged in a predetermined encoding process unit containing a plurality of frame images.

In accordance with another embodiment of the present invention, a decode control method for decoding encoded data and generating reverse playback image data, includes steps of controlling the reading of the encoded data at a specified playback speed, generating, from the encoded data read under the control of the read control step, an encoded data group composed of a first encoded data unit to be displayed in reverse playback and a second encoded data unit required to decode the first encoded data unit, distributing the encoded data group among a plurality of decoders decoding in accordance with the specified playback speed, and generating the reverse playback image data responsive to the specified playback speed, based on the first encoded data unit, contained in a data group decoded from the encoded data group by the decoders.

The decode control method thus shortens a playback delay from the start of a decoding process of encoded data to the displaying of a playback image, and improves response characteristic in the reverse playback operation of the encoded data arranged in a predetermined encoding process unit containing a plurality of frame images.

BRIEF DESCRIPTION OF THE DRAWINGS

FIG. 14 is a timing diagram illustrates a specific process of the playback apparatus during an ×1 speed operation in accordance with the second embodiment of the present invention;

FIG. 16 is a timing diagram illustrating a specific process of the playback apparatus during an ×2 speed playback operation in accordance with the second embodiment of the present invention;

DESCRIPTION OF THE PREFERRED EMBODIMENTS

Embodiments of the present invention are described below with reference the drawings.

Figure 1:
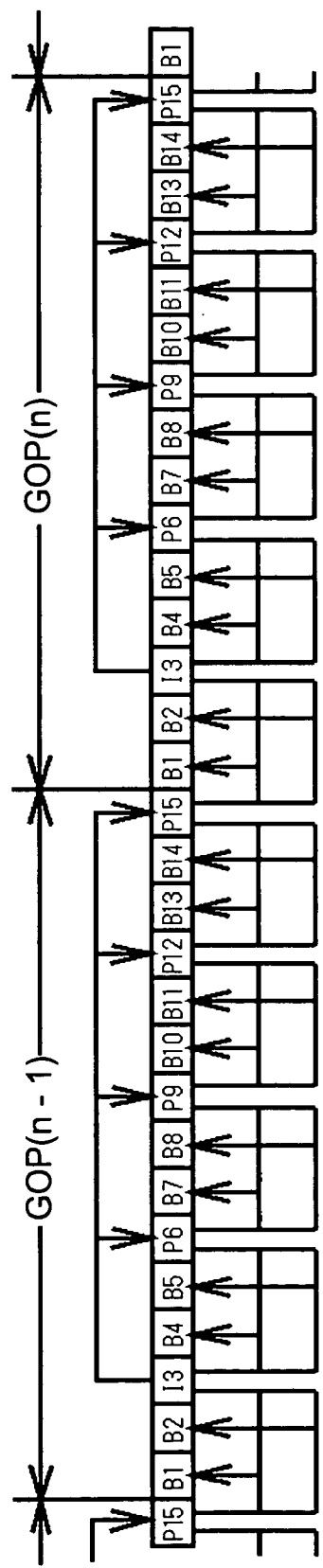
FIG. 1 illustrates the picture structure of a GOP.

A long GOP MPEG encoding process with N being 15 and M being 3 is now performed. With reference to FIG. 1, a third frame image in each GOP is intra-frame encoded and thus converted into the I picture. Sixth, ninth, twelfth, and fifteenth frame images are encoded in a forward prediction process using one of the I picture and the P picture preceding in time sequence, and are thus converted into P pictures.

First and second frame images are encoded in a bidirectional prediction process using last P picture in a preceding GOP and the I picture of own GOP, and thus converted into B pictures. Fourth, fifth, seventh, eighth, tenth, eleventh, thirteenth, and fourteenth frame images are encoded in a bidirectional prediction process using prior or subsequent I pictures or prior or subsequent P pictures of own GOP, and are thus converted into the B pictures.

Each GOP in the encoded data obtained as a result of the encoding process include B1, B2, I3, B4, B5, P6, B7, B8, P9, B10, B11, P12, B13, B14, and P15 in a display order. Here, the I picture, the P picture and the B picture are represented by the letters "I", "P", and "B", and each letter is followed by a number representing a display order thereof.

The B picture is encoded or decoded by referencing not only the I picture and the P picture preceding in time sequence but also the I picture and the B picture subsequent in time sequence. The I picture and the P picture to be referenced during the encoding process and the decoding process need to be encoded or decoded beforehand.

Figure 2:
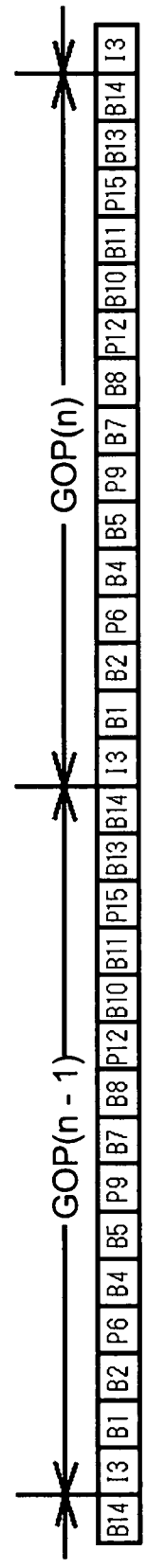
FIG. 2 illustrates the structure of an MPEG stream data.

In accordance with the MPEG algorithm, the frame images are rearranged on a per GOP basis to a coding order of I3, B1, B2, P6, B4, B5, P9, B7, B8, P12, B10, B11, P15, B13, and B14 before the encoding (compression) process as shown in FIG. 2. The encoded data thus obtained with the picture data thereof unchanged is recorded as MPEG stream data onto a recording medium, or transmitted to a decoder side.

When the MPEG stream data with N being 15 and M being 3 is decoded as previously discussed with reference to FIG. 1, pictures I3 through B14 can be decoded by referencing only the encoded data of own GOP. However, pictures B1 and B2 need to be decoded by referencing decoded data of the picture P15 of an immediately preceding GOP in addition to the decoded data of the picture I3 of own GOP. To decode the picture P15 of the immediately preceding GOP, the decoded data of the pictures I3, P6, P9, and P12 of the immediately preceding GOP is required.

Figure 3:
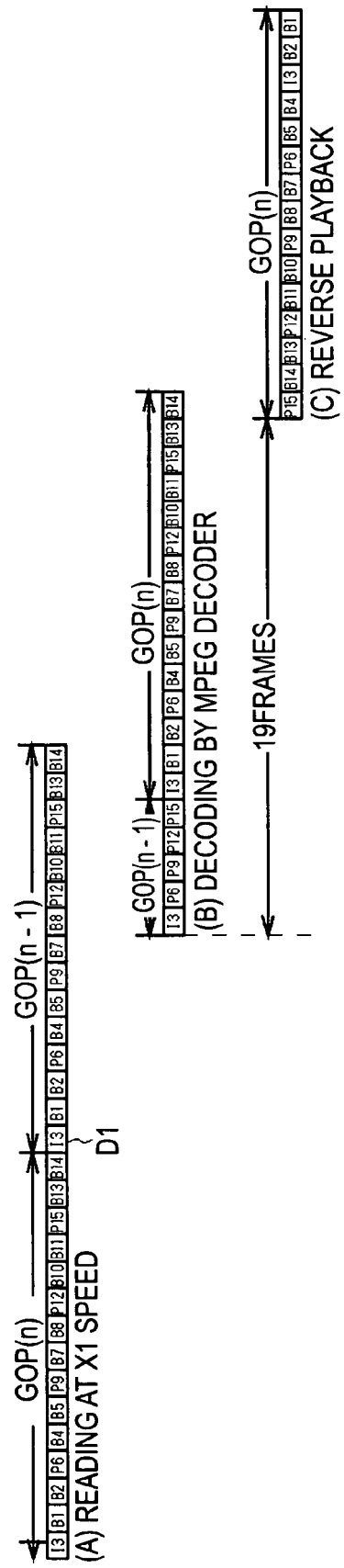
FIG. 3 illustrates a process of a known ×1 speed reverse playback operation.

In the known technique, MPEG stream data D1 shown in a portion (A) of FIG. 3 is read on a per GOP basis in the coding order of I3, B1, B2, P6, B4, B5, P9, B7, B8, P12, B10, B11, P15, B13, and B14. MPEG stream data shown in a portion (B) of FIG. 3, including pictures I3, P6, P9, P12, and P15 of an (n−1)-th GOP(n−1) and pictures I3, B1, B2, P6, B4, B5, P9, B7, B8, P12, B10, B11, P15, B13, and B14 of an n-th GOP(n), is successively decoded by a single MPEG decoder.

The n-th GOP(n) data stream is rearranged in the display order of MPEG stream data shown in a portion (C) of FIG. 3, namely, P15, B14, B13, P12, B11, B10, P9, B8, B7, P6, B5, B4, I3, B2, and B1. The reverse playback is thus performed at an ×1 speed.

A period of time of 19 frames is required from the start of the decoding process of the picture I3 of the (n−1)-th GOP (n−1) to the start of displaying of the picture P15 of the n-th GOP (n).

Figure 4:
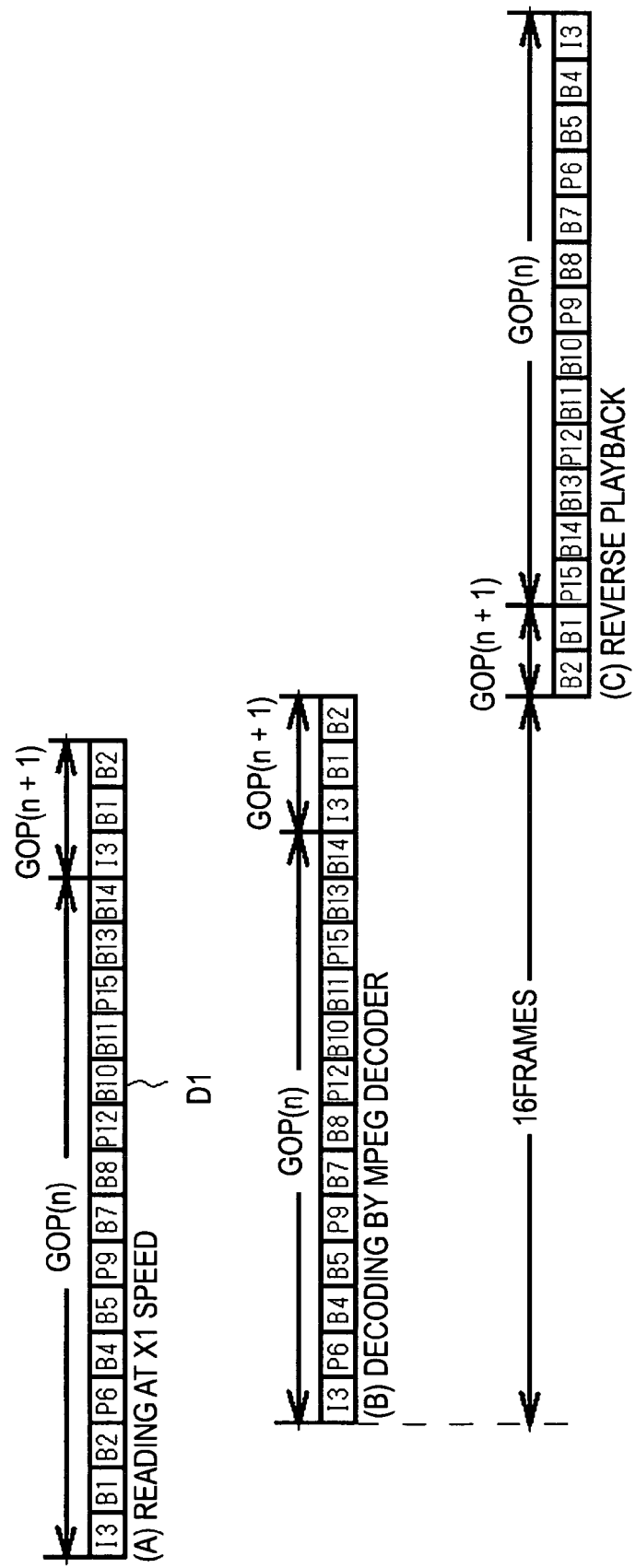
FIG. 4 illustrates a process of a known ×1 speed reverse playback operation.

In the known technique, MPEG stream data D1 shown in the portion (A) of FIG. 4 is read on a per GOP basis in the coding order of I3, B1, B2, P6, B4, B5, P9, B7, B8, P12, B10, B11, P15, B13, B14, I3, B1, and B2 with GOP shifted, i.e., the pictures of the n-th GOP(n) are followed by the pictures I3, B1, and B2 of a next (n+1)-th GOP(n+1). MPEG stream data shown in the portion (B) of FIG. 4, including pictures I3, P6, B4, B5, P9, B7, B8, P12, B10, B11, P15, B13, and B14, namely, the n-th GOP(n) without I3, B1, and B2, and pictures I3, B1, and B2 of the next (n+1)-th GOP(n+1), is successively decoded by a single MPEG decoder.

The pictures of (n+1)-th GOP(n+1) and the n-th GOP(n) shown in a portion (C) of FIG. 4 are rearranged to the display order of B2, B1, P15, B14, B13, P12, B11, B10, P9, B8, B7, P6, B5, B4, and I3. The reverse playback is thus performed at an ×1 speed.

A period of time of 16 frames is required from the start of the decoding process of the picture I3 of the n-th GOP(n) to the start of the displaying of the picture B2 of the (n+1)-th GOP(n+1).

In accordance with a playback apparatus of embodiments of the present invention, a plurality of MPEG decoders perform the decoding process in parallel, thereby shortening a delay time from the start of the decoding process of the pictures of the n-th GOP(n) to the playback of the pictures to be displayed.

Figure 5:
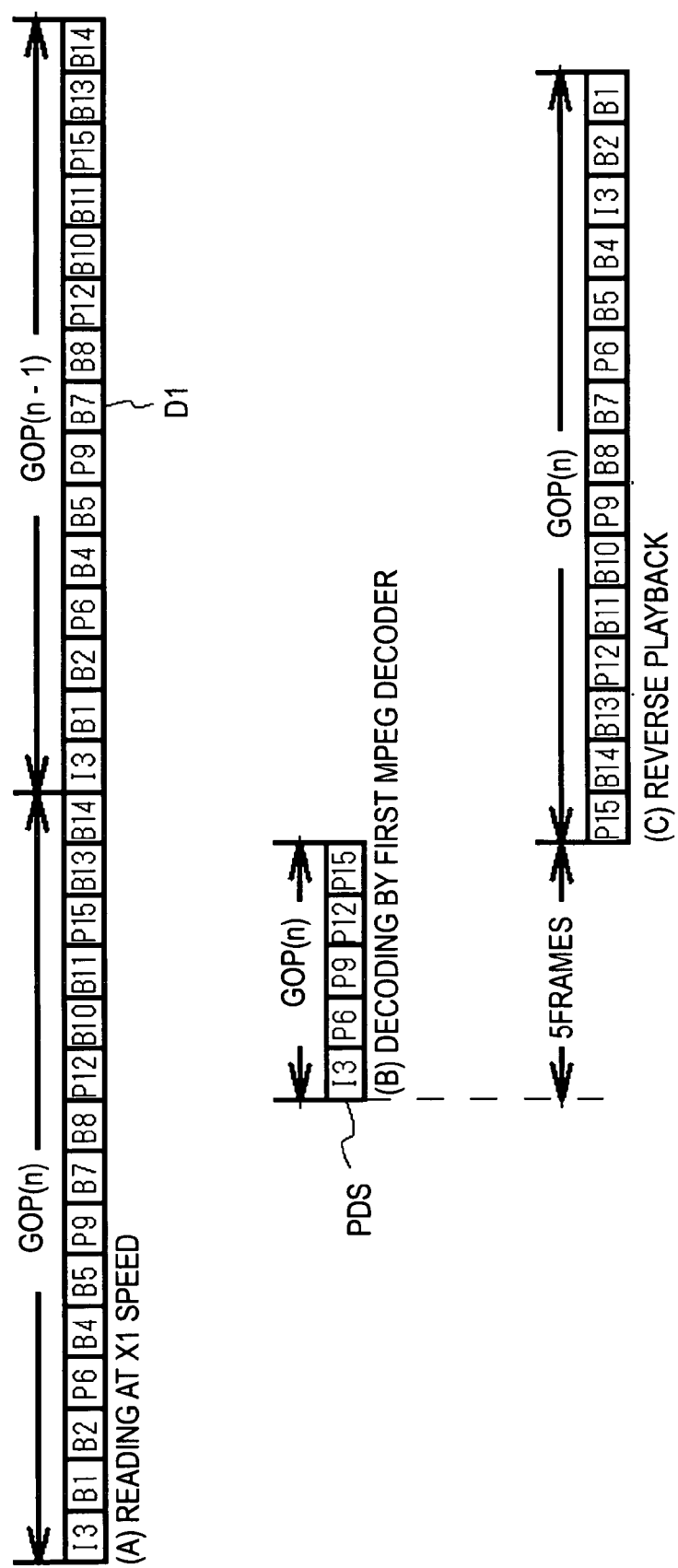
FIG. 5 illustrates the structure of a playback delay shortening picture group.

More specifically, a picture group is generated from a picture of any n-th GOP(n) (B) of FIG. 5 and a picture required to decode the picture for MPEG stream data D1 shown in a portion (A) of FIG. 5 read on a per GOP basis. If a picture shown in a portion (C) of FIG. 5 to be displayed is a picture P15 of the n-th GOP(n), the picture group of the pictures I13, P6, P9, and P15 of the n-the GOP(n) thus produced has the shortest delay time from the start of the decoding process of the pictures of the n-th GOP(n) to the display of the pictures.

A picture group is composed of a picture to be displayed in the n-th GOP(n) and a picture required to decode the picture to be displayed (hereinafter referred to as a playback delay shortened (PDS) picture group). The MPEG stream data D1 of the PDS picture group is decoded by an MPEG decoder. The picture of the n-th GOP(n) shown in a portion (C) of FIG. 5, i.e., a picture P15, is thus displayed as a reverse playback image.

Using this principle, the playback apparatus of the embodiment of the present invention successively generates the playback delay shortened picture group PDS shown in a portion (B) of FIG. 5 in response to the MPEG stream data D1 shown in a portion (A) of FIG. 5 that is read on a per GOP basis in the coding order of I3, B1, B2, P6, B4, B5, P9, B7, B8, P12, B10, B11, P15, B13, and B14. The playback delay shortened picture group PDS thus generated is decoded in parallel by a plurality of MPEG decoders. The playback delay from the start of the decoding process of the pictures of the n-th GOP (n) to the displaying of the pictures is thus shortened. This is a first feature of the present invention.

Only a period of time of 5 frames is required from the start of the decoding process of the picture I3 of the n-th GOP(n) to the displaying of the picture P15 of n-th GOP(n).

When the reverse playback moving image of the MPEG stream data D1 is displayed, the B picture is referenced by one of the I picture and the P picture. If the picture of the n-th GOP(n) to be displayed is one of an I picture and a P picture, a B picture to be referenced by the one of the I picture and the P picture is preferably decoded together with the I picture and the P picture for a higher decoding efficiency.

Figure 7:
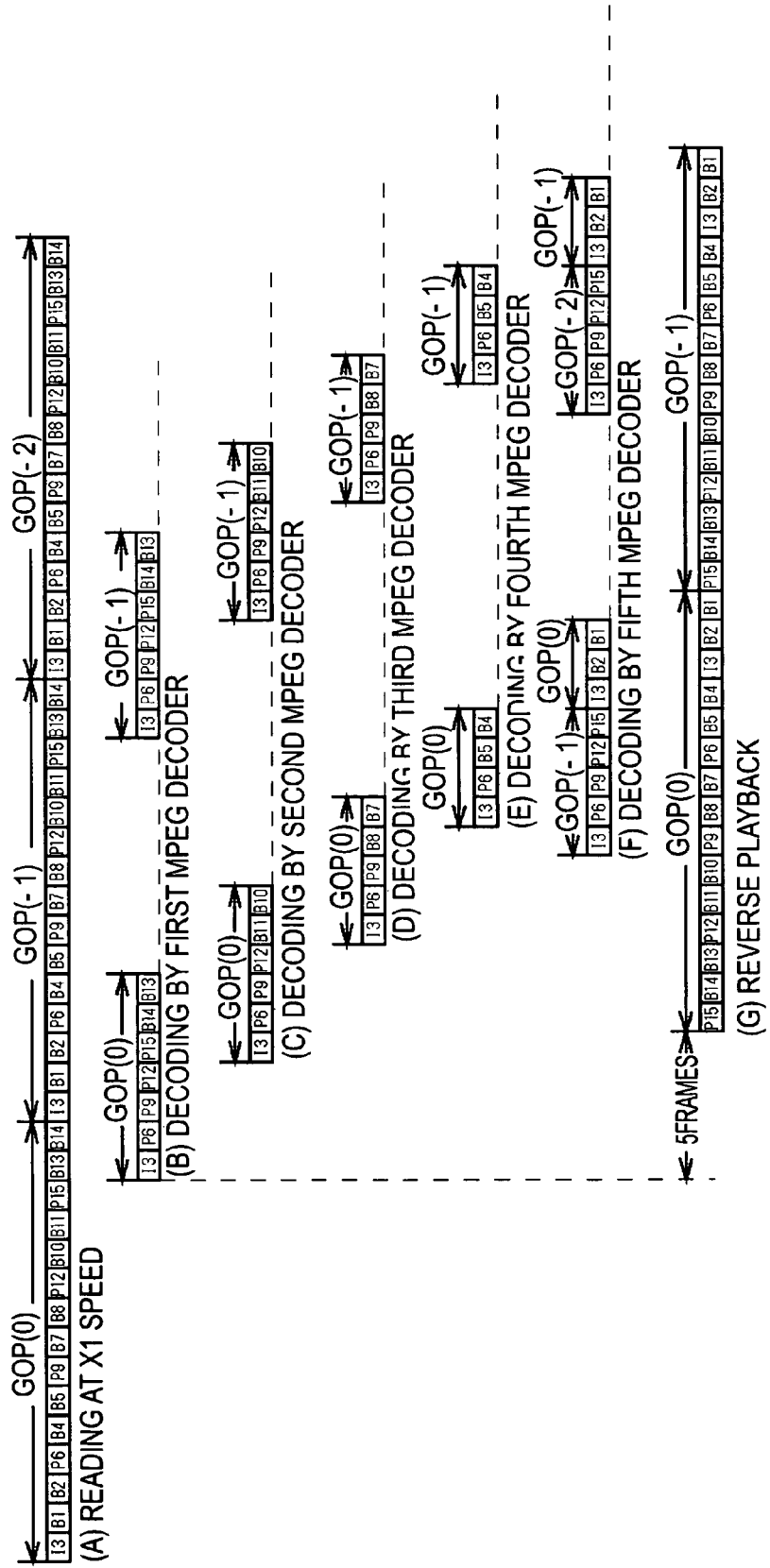
FIG. 7 is a timing diagram illustrating a specific process of the playback apparatus during an ×1 speed playback operation in accordance with the first embodiment of the present invention.

The playback apparatus of the embodiment of the present invention generates the playback delay shortened picture group PDS (see a portion (B) of FIG. 7) including one of the I picture and the P picture of the n-th GOP(n) to be displayed, the picture required to decode the one of the I picture and the P picture, and the B picture to be referenced by one of the I picture and the P picture to be displayed. The decoding process of the MPEG stream data D1 is thus efficiently performed. This is a second feature of the present invention.

When the reverse moving image of the MPEG stream data D1 is displayed, the decoded picture can be displayed on a frame by frame basis. This method is useful if a slowly moving image is displayed. However, if a quickly moving image is displayed in the reverse playback operation, the movement of the image becomes unsmooth and awkward. If the reverse playback operation is performed at an ×2 speed, the movement of the image becomes even more awkward.

When a reverse playback moving image is displayed, the playback apparatus of the embodiment of the present invention displays the frame image of a decoded picture not only on a per frame basis, but also on a per field basis. In accordance with the speed of the reverse playback operation, the playback apparatus successively decodes the picture to be displayed, and successively synthesizes the two fields forming the frame image of each decoded picture in accordance with the reverse playback speed.

More specifically, when the two fields forming the frame image of each decoded picture are displayed, the frame image contains a top field within the picture (referred to as a in-picture top field) displayed previously in time sequence, and a bottom field within the picture (hereinafter referred to as an in-picture bottom field) displayed subsequently in time sequence (see a portion (B) of FIG. 17).

For example, the in-picture bottom field of the top-field data is shifted in the center of gravity thereof to be selected as a top field of a synthesized image to be displayed (hereinafter referred to as a synthesized in-picture top field). A bottom field of the synthesized image (hereinafter referred to as a synthesized in-picture bottom field) is selected so that the field intervals between the in-picture bottom fields become substantially equal. In this way, the intervals of the synthesized image to be displayed is adjusted (see a portion (H) of FIG. 16).

The frame image of each picture is selected to generates a synthesized image so that the field intervals between the synthesized in-picture top fields and the synthesized in-picture bottom fields, of the two fields forming the synthesis image to be displayed, are substantially equal to each other.

If the synthesized image of the reverse playback moving image is generated in this way, the field intervals, each filed interval between the synthesized in-picture top field and the synthesized in-picture bottom field become substantially equal to each other. As a result, a smooth reverse playback moving image results (see the portion (H) of FIG. 16).

In a third feature of the present invention, the playback apparatus of the embodiment of the present invention adjusts the field intervals of the synthesis images to be displayed to be equal to each other, and successively synthesizes the frame images to be displayed.

When a reverse playback moving image is displayed, it takes the longest time to generate one of the picture B1 and the picture B2 (see a portion (F) of FIG. 7).

This is because the pictures I3, P6, P9, P12, and P15 of the immediately preceding GOP and the picture I3 of own GOP need to be decoded to decode one of the picture B1 and the picture B2. If the MPEG stream data D1 of the playback delay shortened picture group PDS thus generated is distributed among a plurality of MPEG decoders in the order of generation, the decoding process cannot be completed in time with the plurality of MPEG decoders (see portions (D) and (E) of FIG. 18).

In a fourth feature of the present invention, the playback apparatus of the embodiment of the present invention distributes the playback delay shortened picture group PDS, typically taking a long time to generate, among a plurality of MPEG decoders regardless of the order of generation, thereby increasing the decoding efficiency of the MPEG stream data D1.

The playback apparatus of embodiments of the present invention is described below.

Figure 6:
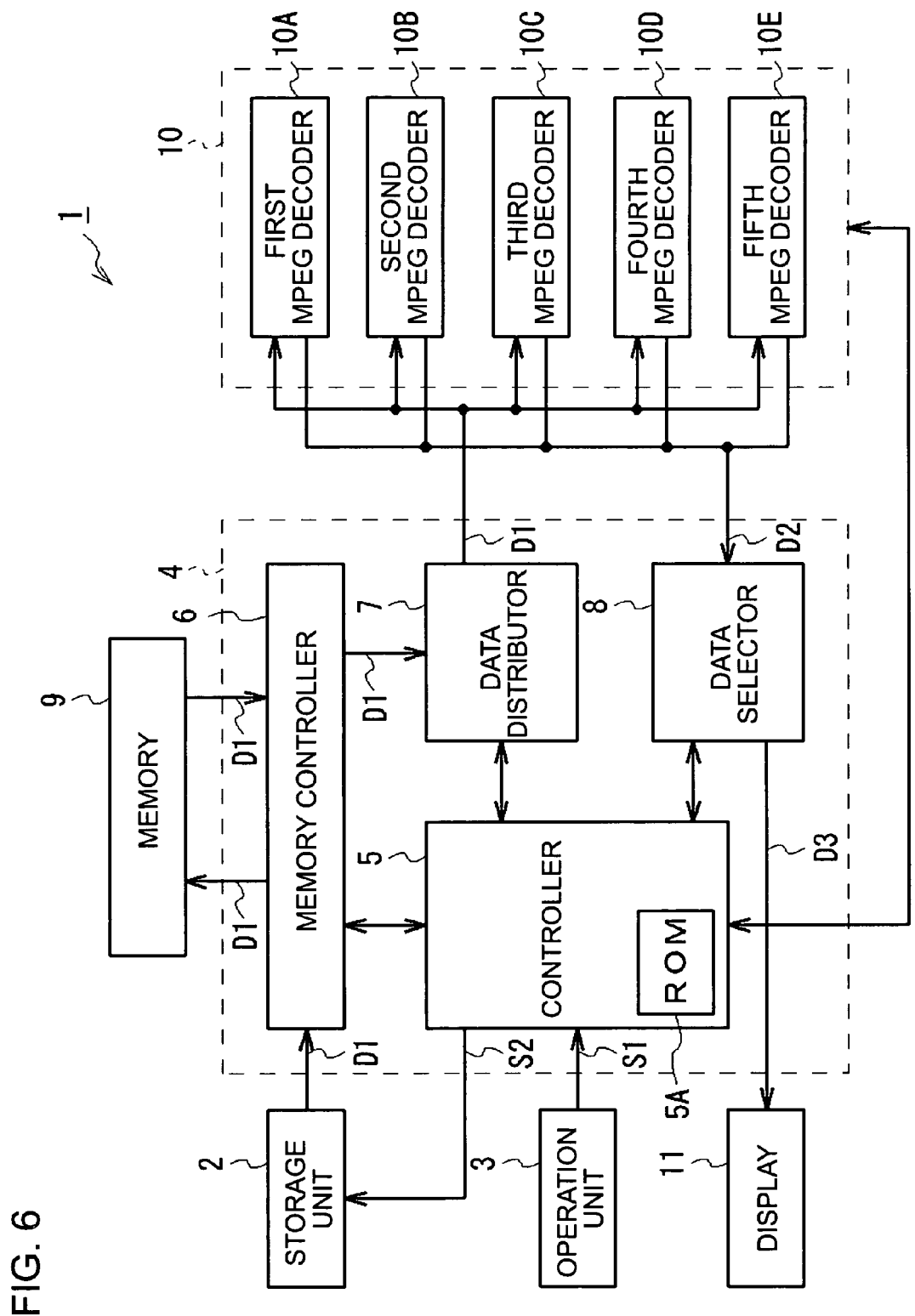
FIG. 6 is a block diagram of a playback apparatus in accordance with a first embodiment of the present invention.

A playback apparatus 1 of a first embodiment of the present invention is shown in FIG. 6. The playback apparatus 1 plays back at any playback direction at any speed or reverse plays back MPEG stream data (N=15 and M=3) of an audio-video (AV) content specified by a user from among AV contents stored in a storage unit 2 such as a hard disk.

When the user operates an operation unit 3 in the playback apparatus 1 to specify an AV content from among the AV contents stored in the storage unit 2, the playback direction and the playback speed of the specified content, a responsive operational signal S1 is transferred to a controller 5 in a decoding control block 4.

The decoding control block 4 includes the controller 5 generally controlling the entire playback apparatus 1, a memory controller 6, a data distributor 7, and a data selector 8. The controller 5 is a microcomputer including a central processing unit (CPU), a read-only memory (ROM) 5A, and a random-access memory (RAM). Based on the operational signal S1 supplied from the operation unit 3, and a control program pre-stored in the ROM 5A, the controller 5 controls the storage unit 2, the memory controller 6, the data distributor 7, the data selector 8, and an MPEG decoder block 10.

The controller 5 outputs, to the storage unit 2, a read signal S2 in response to the operational signal S1. The storage unit 2, under the control of the controller 5, reads the MPEG stream data D1 of the AV content specified from among the AV contents then stored therein, on a per GOP basis at a speed specified by the user, and outputs the read MPEG stream data D1 to the memory controller 6.

The memory controller 6 connects to the memory 9 that can store the MPEG stream data D1 of several GOP's. The supplied MPEG stream data D1 is stored in the memory 9.

When a forward playback direction is selected on the operation unit 3 during a standard playback operation, the memory controller 6, under the control of the controller 5, reads the MPEG stream data D1 on a per GOP basis at a speed specified by the user using the memory 9, and outputs the MPEG stream data D1 to the data distributor 7.

The data distributor 7, under the control of the controller 5, distributes the supplied MPEG stream data D1 among first through fifth MPEG decoders 10A through 10E.

The MPEG decoder block 10 includes the first through fifth MPEG decoders 10A through 10E. Under the control of the controller 5, only the first through fifth MPEG decoders 10A through 10E, among which the data distributor 7 distributes the MPEG stream data D1, operate at the speed specified by the user. The first through fifth MPEG decoders 10A through 10E successively decode the supplied MPEG stream data D1, and outputs resulting stream data of baseband (hereinafter referred to as baseband stream data) D2 to the data selector 8.

The data selector 8, under the control of the controller 5, selects a picture of the baseband stream data D2 supplied from the first through fifth MPEG decoders 10A through 10E in operation, and performs effect processes, including color correction, on the selected picture as necessary, and then outputs selected baseband data stream D3 to the display 11.

A moving image of the AV content specified by the user is displayed on the display 11 in a forward playback direction at a speed specified by the user in response to the selected baseband data stream D3.

When a reverse playback direction is selected on the operation unit 3 during a reverse playback operation, the memory controller 6, under the control of the controller 5, generates the MPEG stream data D1 of the playback delay shortened picture group PDS of FIG. 5 while rearranging the display order to the reverse direction using the memory 9. The memory controller 6 thus outputs the MPEG stream data D1, to the data distributor 7 at the final playback image output timing.

Under the control of the controller 5, the data distributor 7 distributes the MPEG stream data D1 of the supplied playback delay shortened picture group PDS among the first through fifth MPEG decoders 10A through 10E in the MPEG decoder block 10.

The MPEG decoder block 10, under the control of the controller 5, operates only the first through fifth MPEG decoders 10A through 10E among which the data distributor 7 distributes the MPEG stream data D1 of the playback delay shortened picture group PDS at a specified speed. The first through fifth MPEG decoders 10A through 10E in operation successively decode the supplied MPEG stream data D1 of the supplied playback delay shortened picture group PDS, and outputs resulting stream data of baseband (hereinafter referred to as baseband stream data) D2 to the data selector 8.

The data selector 8, under the control of the controller 5, selects a picture of the baseband stream data D2 supplied from the first through fifth MPEG decoders 10A through 10E in operation, and performs effect processes, including color correction, on the selected picture as necessary, and then outputs selected baseband data stream D3 thus obtained to the display 11.

A moving image of the AV content specified by the user is displayed on the display 11 in a reverse playback direction at a speed specified by the user in response to the selected baseband data stream D3.

A specific process of the playback apparatus 1 during the reverse playback operation is described below.

During an ×1 speed reverse playback operation, the storage unit 2 reads the MPEG stream data D1 shown in a portion (A) of FIG. 7 of the specified AV content at an ×1 speed on a per GOP basis, transfers the MPEG stream data D1 to the memory controller 6, and stores the MPEG stream data D1 onto the memory 9.

In response to the MPEG stream data D1 stored on the memory 9, the memory controller 6 under the control of the controller 5 successively generates the MPEG stream data D1 of the playback delay shortened picture group PDS described with reference to FIG. 5 while rearranging the display order to the reverse direction. The memory controller 6 outputs the MPEG stream data D1 to the data distributor 7 at the final playback image output timing.

The data distributor 7, under the control of the controller 5, distributes the MPEG stream data D1 of the playback delay shortened picture group PDS among the first through fifth MPEG decoders 10A through 10E. The MPEG stream data D1 of a (5k−4)-th playback delay shortened picture group PDS is distributed to the first MPEG decoder 10A (k=1, 2, . . . ). The MPEG stream data D1 of a (5k−3)-th playback delay shortened picture group PDS is distributed to the second MPEG decoder 10B. The MPEG stream data D1 of a (5k−2)-th playback delay shortened picture group PDS is distributed to the third MPEG decoder 10C. The MPEG stream data D1 of a (5k−1)-th playback delay shortened picture group PDS is distributed to the fourth MPEG decoder 10D. The MPEG stream data D1 of a 5k-th playback delay shortened picture group PDS is distributed to the fifth MPEG decoder 10E.

The first MPEG decoder 10A starts decoding the MPEG stream data D1 of the playback delay shortened picture group PDS supplied from the data distributor 7 as shown in a portion (B) of FIG. 7, at the timing the encoded data of the picture B13 of the 0th GOP(0) is read from the storage unit 2. The first MPEG decoder 10A successively decodes the encoded data (MPEG stream data D1) of each picture in the playback delay shortened picture group PDS. The first MPEG decoder 10A further decodes the MPEG stream data D1 of the subsequently supplied playback delay shortened picture group PDS at predetermined timings, and then outputs the resulting baseband stream data D2 to the data selector 8.

The second MPEG decoder 10B starts decoding the MPEG stream data D1 of the playback delay shortened picture group PDS supplied from the data distributor 7 as shown in a portion (C) of FIG. 7, at the timing the first MPEG decoder 10A starts decoding the picture P15 of the 0th GOP(0). The second MPEG decoder 10B successively decodes the encoded data (MPEG stream data D1) of each picture in the playback delay shortened picture group PDS. The second MPEG decoder 10B further decodes the MPEG stream data D1 of the subsequently supplied playback delay shortened picture group PDS at predetermined timings, and then outputs the resulting baseband stream data D2 to the data selector 8.

The third MPEG decoder 10C starts decoding the MPEG stream data D1 of the playback delay shortened picture group PDS supplied from the data distributor 7 as shown in a portion (D) of FIG. 7, at the timing the second MPEG decoder 10B starts decoding the picture B11 of the 0th GOP(0). The third MPEG decoder 10C successively decodes the encoded data (MPEG stream data D1) of each picture in the playback delay shortened picture group PDS. The third MPEG decoder 10C further decodes the MPEG stream data D1 of the subsequently supplied playback delay shortened picture group PDS at predetermined timings, and then outputs the resulting baseband stream data D2 to the data selector 8.

The fourth MPEG decoder 10D starts decoding the MPEG stream data D1 of the playback delay shortened picture group PDS supplied from the data distributor 7 as shown in a portion (E) of FIG. 7, at the timing the third MPEG decoder 10C starts decoding the picture B7 of the 0th GOP(0). The fourth MPEG decoder 10D successively decodes the encoded data (MPEG stream data D1) of each picture in the playback delay shortened picture group PDS. The fourth MPEG decoder 10D further decodes the MPEG stream data D1 of the subsequently supplied playback delay shortened picture group PDS at predetermined timings, and then outputs the resulting baseband stream data D2 to the data selector 8.

The fifth MPEG decoder 10E starts decoding the MPEG stream data D1 of the playback delay shortened picture group PDS supplied from the data distributor 7 as shown in a portion (F) of FIG. 7, at the timing the fourth MPEG decoder 10D starts decoding the picture I3 of the 0th GOP(0). The fifth MPEG decoder 10E successively decodes the encoded data (MPEG stream data D1) of each picture in the playback delay shortened picture group PDS. The fifth MPEG decoder 10E further decodes the MPEG stream data D1 of the subsequently supplied playback delay shortened picture group PDS at predetermined timings, and then outputs the resulting baseband stream data D2 to the data selector 8.

The data selector 8 starts a selection process at a timing 5 frames after the start of the decoding process of the first MPEG decoder 10A of decoding the picture I3 of the 0th GOP(0) as shown in a portion (G) of FIG. 7. Specifically, the data selector 8 selects pictures to be displayed of the baseband stream data D2 provided from the first through fifth MPEG decoders 10A through 10E. More specifically, the data selector 8 selects pictures P15, B14, and B13 of the 0th GOP(0) from the baseband stream data D2 supplied from the first MPEG decoder 10A, pictures P12, B11, and B10 of the 0th GOP(0) from the baseband stream data D2 supplied from the second MPEG decoder 10B, pictures P9, B8, and B7 of the 0th GOP(0) from the baseband stream data D2 supplied from the third MPEG decoder 10C, pictures P6, B5, and B4 of the 0th GOP(0) from the baseband stream data D2 supplied from the fourth MPEG decoder 10D, and pictures I3, B1, and B2 of the 0th GOP(0) from the baseband stream data D2 supplied from the fifth MPEG decoder 10E.

The data selector 8 performs the effect process on the selected baseband stream data D2 as necessary, and outputs the resulting selected baseband stream data D3 to the display 11.

The playback apparatus 1 thus generates the selected baseband data stream D3, and causes the display 11 to display an ×1 speed reverse playback moving image responsive to the selected baseband data stream D3. The playback apparatus 1 thus requires a period of only 5 frames from the start of the decoding process of the picture I3 of the 0th GOP(0) to the displaying of the picture P15 of the 0th GOP(0).

Figure 8:
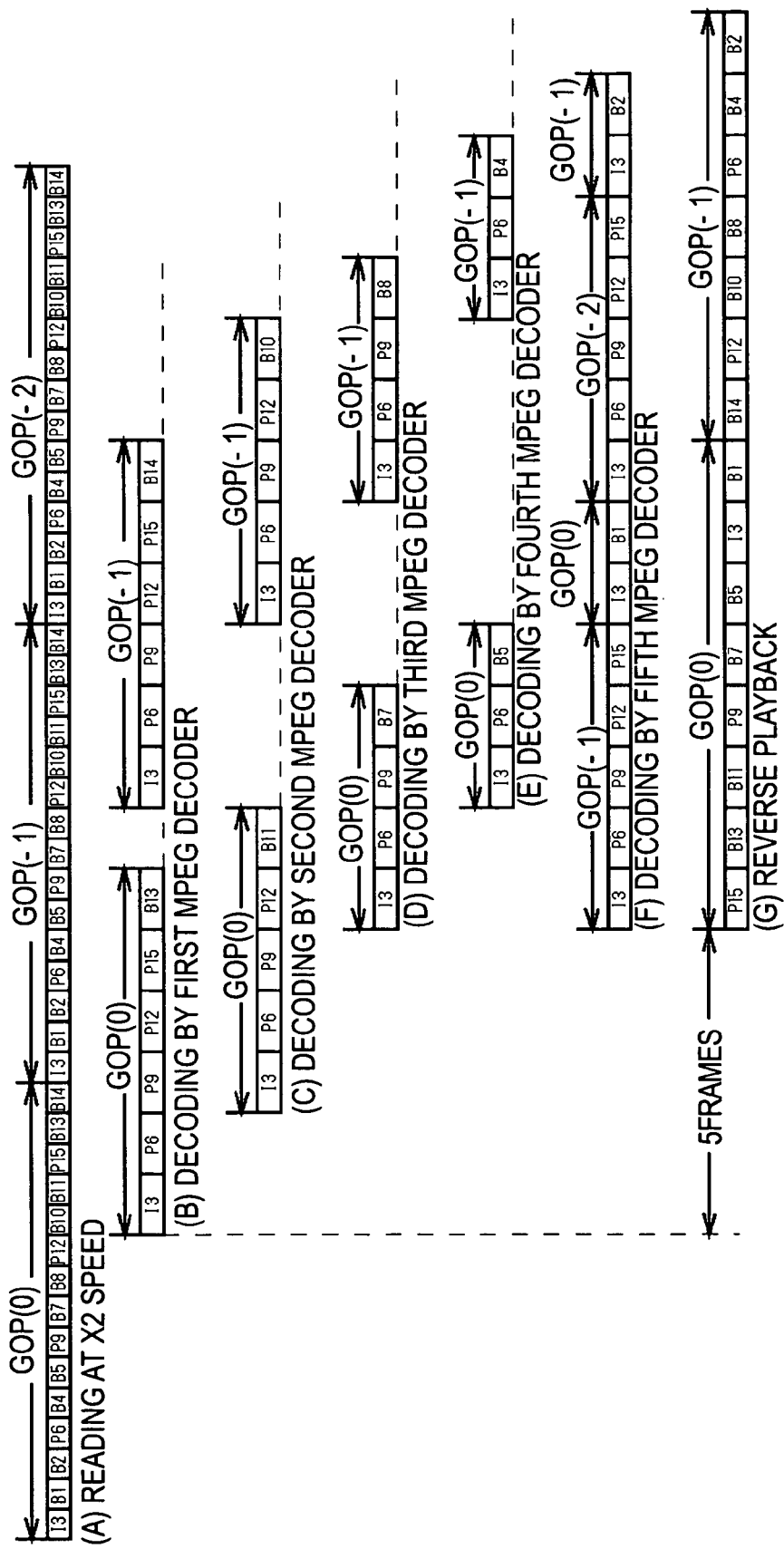
FIG. 8 is a timing diagram illustrating a specific process of the playback apparatus during an ×2 speed playback operation in accordance with the first embodiment of the present invention.

During an ×2 speed reverse playback operation, the storage unit 2 reads the MPEG stream data D1 of an AV content on a per GOP basis at the ×2 speed as shown in a portion (A) of FIG. 8, and outputs the read MPEG stream data D1 to the memory controller 6 for storage onto the memory 9.

In response to the MPEG stream data D1 stored on the memory 9, the memory controller 6 under the control of the controller 5 successively generates the MPEG stream data D1 of the playback delay shortened picture group PDS described with reference to FIG. 5 while rearranging the display order to the reverse direction. The memory controller 6 outputs the MPEG stream data D1 to the data distributor 7 at the final playback image output timing.

The data distributor 7, under the control of the controller 5, distributes the MPEG stream data D1 of the playback delay shortened picture group PDS among the first through fifth MPEG decoders 10A through 10E in the same manner as in the x1 speed reverse playback operation.

The first MPEG decoder 10A starts decoding the MPEG stream data D1 of the playback delay shortened picture group PDS supplied from the data distributor 7 as shown in a portion (B) of FIG. 8, at the timing the encoded data of the picture B10 of the 0th GOP(0) is read from the storage unit 2. The first MPEG decoder 10A successively decodes the encoded data (MPEG stream data D1) of each picture in the playback delay shortened picture group PDS. The first MPEG decoder 10A further decodes the MPEG stream data D1 of the subsequently supplied playback delay shortened picture group PDS at predetermined timings, and then outputs the resulting baseband stream data D2 to the data selector 8.

The second MPEG decoder 10B starts decoding the MPEG stream data D1 of the playback delay shortened picture group PDS supplied from the data distributor 7 as shown in a portion (C) of FIG. 8, at the timing the first MPEG decoder 10A starts decoding the picture P9 of the 0th GOP(0). The second MPEG decoder 10B successively decodes the encoded data (MPEG stream data D1) of each picture in the playback delay shortened picture group PDS. The second MPEG decoder 10B further decodes the MPEG stream data D1 of the subsequently supplied playback delay shortened picture group PDS at predetermined timings, and then outputs the resulting baseband stream data D2 to the data selector 8.

The third MPEG decoder 10C starts decoding the MPEG stream data D1 of the playback delay shortened picture group PDS supplied from the data distributor 7 as shown in a portion (D) of FIG. 8, at the timing the second MPEG decoder 10B starts decoding the picture P12 of the 0th GOP(0). The third MPEG decoder 10C successively decodes the encoded data (MPEG stream data D1) of each picture in the playback delay shortened picture group PDS. The third MPEG decoder 10C further decodes the MPEG stream data D1 of the subsequently supplied playback delay shortened picture group PDS at predetermined timings, and then outputs the resulting baseband stream data D2 to the data selector 8.

The fourth MPEG decoder 10D starts decoding the MPEG stream data D1 of the playback delay shortened picture group PDS supplied from the data distributor 7 as shown in a portion (E) of FIG. 8, at the timing the third MPEG decoder 10C starts decoding the picture P9 of the 0th GOP(0). The fourth MPEG decoder 10D successively decodes the encoded data (MPEG stream data D1) of each picture in the playback delay shortened picture group PDS. The fourth MPEG decoder 10D further decodes the MPEG stream data D1 of the subsequently supplied playback delay shortened picture group PDS at predetermined timings, and then outputs the resulting baseband stream data D2 to the data selector 8.

The fifth MPEG decoder 10E starts decoding the MPEG stream data D1 of the playback delay shortened picture group PDS supplied from the data distributor 7 as shown in a portion (F) of FIG. 8, at the timing two frames before the third MPEG decoder 10C starts decoding the picture I3 of the 0th GOP(0). The fifth MPEG decoder 10E successively decodes the encoded data (MPEG stream data D1) of each picture in the playback delay shortened picture group PDS. The fifth MPEG decoder 10E further decodes the MPEG stream data D1 of the subsequently supplied playback delay shortened picture group PDS at predetermined timings, and then outputs the resulting baseband stream data D2 to the data selector 8.

The data selector 8 starts a selection process at a timing 5 frames after the start of the decoding process of the first MPEG decoder 10A of decoding the picture I3 of the 0th GOP(0) as shown in a portion (G) of FIG. 8. Specifically, the data selector 8 selects pictures to be displayed of the baseband stream data D2 provided from the first through fifth MPEG decoders 10A through 10E. More specifically, the data selector 8 selects pictures P15 and B13 of the 0th GOP(0) from the baseband stream data D2 supplied from the first MPEG decoder 10A, picture B11 of the 0th GOP(0) from the baseband stream data D2 supplied from the second MPEG decoder 10B, pictures P9 and B7 of the 0th GOP(0) from the baseband stream data D2 supplied from the third MPEG decoder 10C, picture B5 of the 0th GOP(0) from the baseband stream data D2 supplied from the fourth MPEG decoder 10D, and pictures I3 and B1 of the 0th GOP(0) from the baseband stream data D2 supplied from the fifth MPEG decoder 10E.

The data selector 8 performs the effect process on the selected baseband stream data D2 as necessary, and outputs the resulting selected baseband data stream D3 to the display 11.

The playback apparatus 1 thus generates the selected baseband data stream D3, and causes the display 11 to display the x2 speed reverse playback moving image responsive to the selected baseband data stream D3. The playback apparatus 1 thus requires a period of only 5 frames from the start of the decoding process of the picture I3 of the 0th GOP(0) to the displaying of the picture P15 of the 0th GOP(0).

Figure 9:
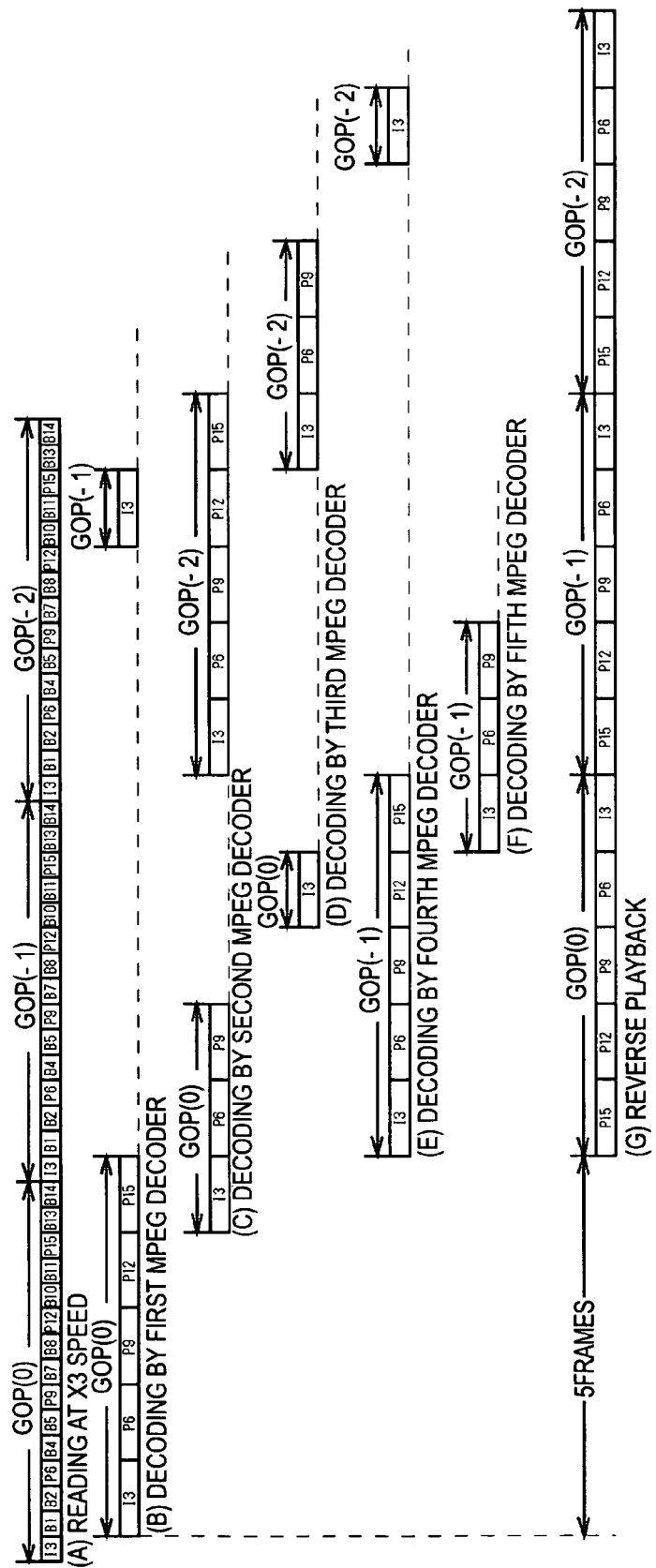
FIG. 9 is a timing diagram illustrating a specific process of the playback apparatus during an ×3 speed playback operation in accordance with the first embodiment of the present invention.

During an x3 speed reverse playback operation, the storage unit 2 reads the MPEG stream data D1 of an AV content on a per GOP basis at the x3 speed as shown in a portion (A) of FIG. 9, and outputs the read MPEG stream data D1 to the memory controller 6 for storage onto the memory 9.

In response to the MPEG stream data D1 stored on the memory 9, the memory controller 6 under the control of the controller 5 successively generates the MPEG stream data D1 of the playback delay shortened picture group PDS described with reference to FIG. 5 while rearranging the display order to the reverse direction. The memory controller 6 outputs the MPEG stream data D1 to the data distributor 7 at the final playback image output timing.

The data distributor 7, under the control of the controller 5, distributes the MPEG stream data D1 of the playback delay shortened picture group PDS among the first through fifth MPEG decoders 10A through 10E in the same manner as in the x1 speed reverse playback operation.

The first MPEG decoder 10A starts decoding the MPEG stream data D1 of the playback delay shortened picture group PDS supplied from the data distributor 7 as shown in a portion (B) of FIG. 9, at the timing the encoded data of the picture B1 of the 0th GOP(0) is read from the storage unit 2. The first MPEG decoder 10A successively decodes the encoded data (MPEG stream data D1) of each picture in the playback delay shortened picture group PDS. The first MPEG decoder 10A further decodes the MPEG stream data D1 of the subsequently supplied playback delay shortened picture group PDS at predetermined timings, and then outputs the resulting baseband stream data D2 to the data selector 8.

The second MPEG decoder 10B starts decoding the MPEG stream data D1 of the playback delay shortened picture group PDS supplied from the data distributor 7 as shown in a portion (C) of FIG. 9, at the timing the MPEG decoding unit 10 starts decoding the picture P15 of the 0th GOP(0). The second MPEG decoder 10B successively decodes the encoded data (MPEG stream data D1) of each picture in the playback delay shortened picture group PDS. The second MPEG decoder 10B further decodes the MPEG stream data D1 of the subsequently supplied playback delay shortened picture group PDS at predetermined timings, and then outputs the resulting baseband stream data D2 to the data selector 8.

The third MPEG decoder 10C starts decoding the MPEG stream data D1 of the playback delay shortened picture group PDS supplied from the data distributor 7 as shown in a portion (D) of FIG. 9, at the timing the second MPEG decoder 10B starts the picture P9 of the 0th GOP(0). The third MPEG decoder 10C successively decodes the encoded data (MPEG stream data D1) of each picture in the playback delay shortened picture group PDS. The third MPEG decoder 10C further decodes the MPEG stream data D1 of the subsequently supplied playback delay shortened picture group PDS at predetermined timings, and then outputs the resulting baseband stream data D2 to the data selector 8.

The fourth MPEG decoder 10D starts decoding the MPEG stream data D1 of the playback delay shortened picture group PDS supplied from the data distributor 7 as shown in a portion (E) of FIG. 9, at the timing three frames before the third MPEG decoder 10C starts decoding the picture I3 of the 0th GOP(0). The fourth MPEG decoder 10D successively decodes the encoded data (MPEG stream data D1) of each picture in the playback delay shortened picture group PDS. The fourth MPEG decoder 10D further decodes the MPEG stream data D1 of the subsequently supplied playback delay shortened picture group PDS at predetermined timings, and then outputs the resulting baseband stream data D2 to the data selector 8.

The fifth MPEG decoder 10E starts decoding the MPEG stream data D1 of the playback delay shortened picture group PDS supplied from the data distributor 7 as shown in a portion (F) of FIG. 9, at the timing the fourth MPEG decoder 10D starts decoding the picture P15 of the minus first GOP(−1). The fifth MPEG decoder 10E successively decodes the encoded data (MPEG stream data D1) of each picture in the playback delay shortened picture group PDS. The fifth MPEG decoder 10E further decodes the MPEG stream data D1 of the subsequently supplied playback delay shortened picture group PDS at predetermined timings, and then outputs the resulting baseband stream data D2 to the data selector 8.

The data selector 8 starts a selection process at a timing 5 frames after the start of the decoding process of the first MPEG decoder 10A of decoding the picture I3 of the 0th GOP(0) as shown a portion (G) of FIG. 9. Specifically, the data selector 8 selects pictures to be displayed of the baseband stream data D2 provided from the first through fifth MPEG decoders 10A through 10E. More specifically, the data selector 8 selects pictures P15 and P12 of the 0th GOP(0) from the baseband stream data D2 supplied from the first MPEG decoder 10A, pictures P9 and P6 of the 0th GOP(0) from the baseband stream data D2 supplied from the second MPEG decoder 10B, picture I3 of the 0th GOP(0) from the baseband stream data D2 supplied from the third MPEG decoder 10C, pictures P15 and P12 of the minus first GOP(−1) from the baseband stream data D2 supplied from the fourth MPEG decoder 10D, and pictures P9 and P6 of the minus first GOP (−1) from the baseband stream data D2 supplied from the fifth MPEG decoder 10E.

The data selector 8 performs the effect process on the selected baseband stream data D2 as necessary, and outputs the resulting selected baseband data stream D3 to the display 11.

The playback apparatus 1 thus generates the selected baseband data stream D3, and causes the display 11 to display the ×3 speed reverse playback moving image responsive to the selected baseband data stream D3. The playback apparatus 1 thus requires a period of only 5 frames from the start of the decoding process of the picture I3 of the 0th GOP(0) to the displaying of the picture P15 of the 0th GOP(0).

Figure 10:
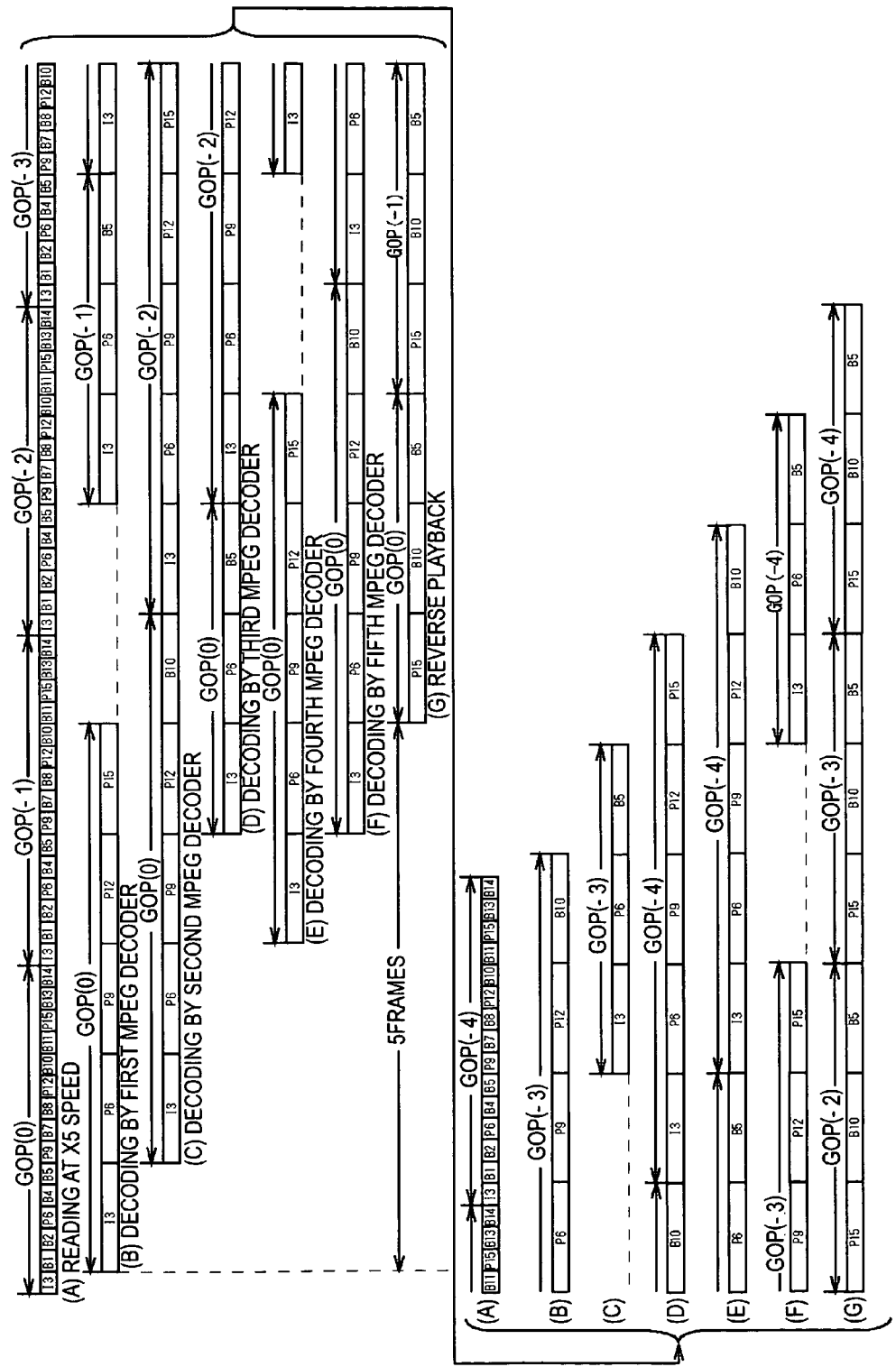
FIG. 10 is a timing diagram illustrating a specific process of the playback apparatus during an ×5 speed playback operation in accordance with the first embodiment of the present invention.

During an ×5 speed reverse playback operation, the storage unit 2 reads the MPEG stream data D1 of an AV content on a per GOP basis at the ×5 speed as shown in a portion (A) of FIG. 10, and outputs the read MPEG stream data D1 to the memory controller 6 for storage onto the memory 9.

In response to the MPEG stream data D1 stored on the memory 9, the memory controller 6 under the control of the controller 5 successively generates the MPEG stream data D1 of the playback delay shortened picture group PDS described with reference to FIG. 5 while rearranging the display order to the reverse direction. The memory controller 6 outputs the MPEG stream data D1 to the data distributor 7 at the final playback image output timing.

The data distributor 7, under the control of the controller 5, distributes the MPEG stream data D1 of the playback delay shortened picture group PDS among the first through fifth MPEG decoders 10A through 10E in the same manner as in the ×1 speed reverse playback operation.

The first MPEG decoder 10A starts decoding the MPEG stream data D1 of the playback delay shortened picture group PDS supplied from the data distributor 7 as shown in a portion (B) of FIG. 10, at the timing the encoded data of the picture B1 of the 0th GOP(0) is read from the storage unit 2. The first MPEG decoder 10A successively decodes the encoded data (MPEG stream data D1) of each picture in the playback delay shortened picture group PDS. The first MPEG decoder 10A further decodes the MPEG stream data D1 of the subsequently supplied playback delay shortened picture group PDS at predetermined timings, and then outputs the resulting baseband stream data D2 to the data selector 8.

The second MPEG decoder 10B starts decoding the MPEG stream data D1 of the playback delay shortened picture group PDS supplied from the data distributor 7 as shown in a portion (C) of FIG. 10, at the timing the first MPEG decoder 10A starts decoding the picture P6 of the 0th GOP(0). The second MPEG decoder 10B successively decodes the encoded data (MPEG stream data D1) of each picture in the playback delay shortened picture group PDS. The second MPEG decoder 10B further decodes the MPEG stream data D1 of the subsequently supplied playback delay shortened picture group PDS at predetermined timings, and then outputs the resulting baseband stream data D2 to the data selector 8.

The third MPEG decoder 10C starts decoding the MPEG stream data D1 of the playback delay shortened picture group PDS supplied from the data distributor 7 as shown in a portion (D) of FIG. 10, at the timing the second MPEG decoder 10B starts decoding the picture P12 of the 0th GOP(0). The third MPEG decoder 10C successively decodes the encoded data (MPEG stream data D1) of each picture in the playback delay shortened picture group PDS. The third MPEG decoder 10C further decodes the MPEG stream data D1 of the subsequently supplied playback delay shortened picture group PDS at predetermined timings, and then outputs the resulting baseband stream data D2 to the data selector 8.

The fourth MPEG decoder 10D starts decoding the MPEG stream data D1 of the playback delay shortened picture group PDS supplied from the data distributor 7 as shown in a portion (E) of FIG. 10, at the timing one frame before the third MPEG decoder 10C starts decoding the picture I3 of the 0th GOP(0). The fourth MPEG decoder 10D successively decodes the encoded data (MPEG stream data D1) of each picture in the playback delay shortened picture group PDS. The fourth MPEG decoder 10D further decodes the MPEG stream data D1 of the subsequently supplied playback delay shortened picture group PDS at predetermined timings, and then outputs the resulting baseband stream data D2 to the data selector 8.

The fifth MPEG decoder 10E starts decoding the MPEG stream data D1 of the playback delay shortened picture group PDS supplied from the data distributor 7 as shown in a portion (F) of FIG. 10, at the timing the fourth MPEG decoder 10D starts decoding the picture P6 of the 0th GOP(0). The fifth MPEG decoder 10E successively decodes the encoded data (MPEG stream data D1) of each picture in the playback delay shortened picture group PDS. The fifth MPEG decoder 10E further decodes the MPEG stream data D1 of the subsequently supplied playback delay shortened picture group PDS at predetermined timings, and then outputs the resulting baseband stream data D2 to the data selector 8.

The data selector 8 starts a selection process at a timing 5 frames after the start of the decoding process of the first MPEG decoder 10A of decoding the picture I3 of the 0th GOP(0) as shown a portion (G) of FIG. 10. Specifically, the data selector 8 selects pictures to be displayed of the baseband stream data D2 provided from the first through fifth MPEG decoders 10A through 10E. More specifically, the data selector 8 selects picture P15 of the 0th GOP(0) from the baseband stream data D2 supplied from the first MPEG decoder 10A, picture B10 of the 0th GOP(0) from the baseband stream data D2 supplied from the second MPEG decoder 10B, pictures B5 of the 0th GOP(0) from the baseband stream data D2 supplied from the third MPEG decoder 10C, picture P15 of the first GOP(1) from the baseband stream data D2 supplied from the fourth MPEG decoder 10D, and picture B10 of the first GOP(1) from the baseband stream data D2 supplied from the fifth MPEG decoder 10E.

The data selector 8 performs the effect process on the selected baseband stream data D2 as necessary, and outputs the resulting selected baseband data stream D3 to the display 11.

The playback apparatus 1 thus generates the selected baseband data stream D3, and causes the display 11 to display the ×5 speed reverse playback moving image responsive to the selected baseband data stream D3. The playback apparatus 1 thus requires a period of only 5 frames from the start of the decoding process of the picture I3 of the 0th GOP(0) to the displaying of the picture P15 of the 0th GOP(0).

Figure 11:
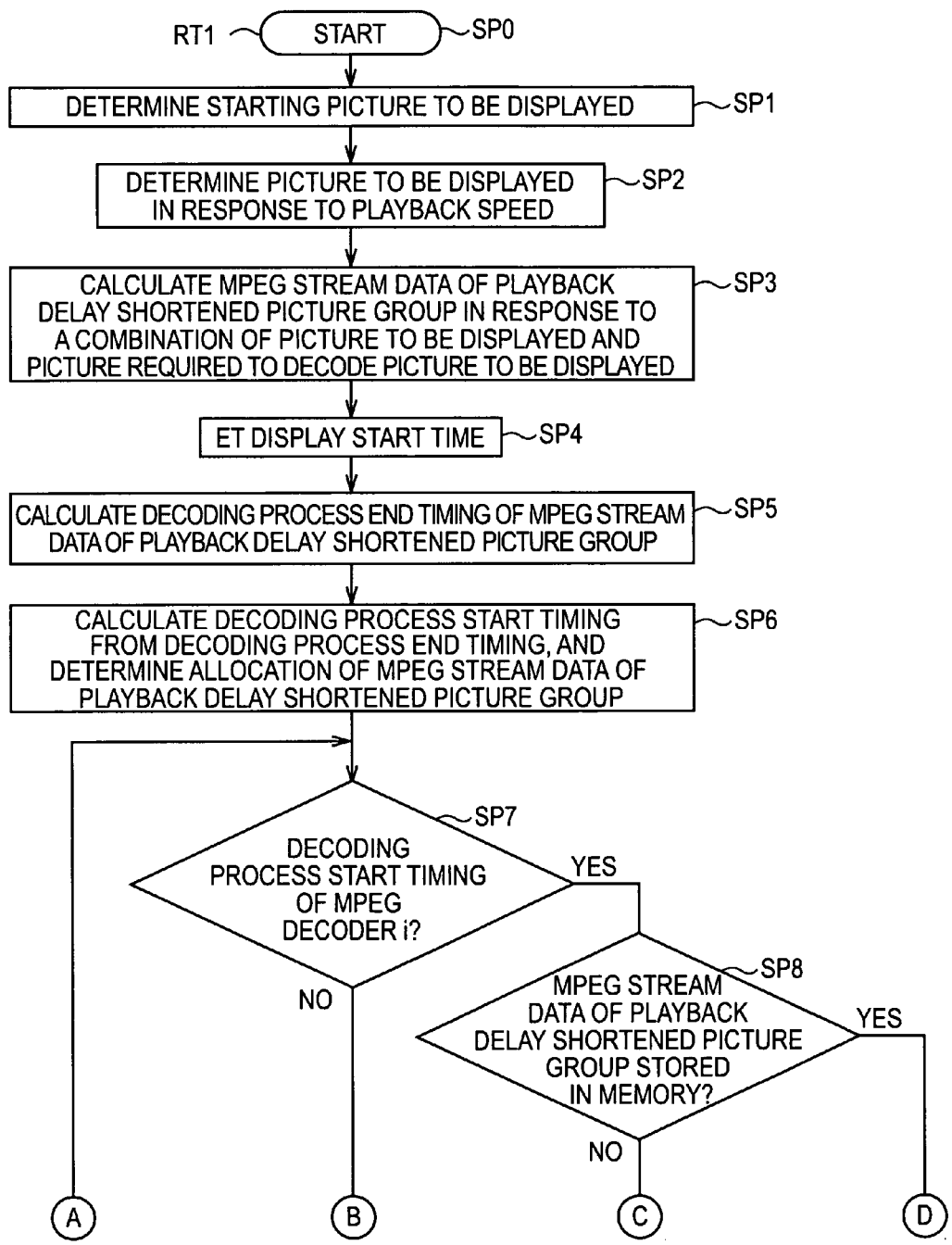
FIG. 11 is a flowchart of a reverse playback process in accordance with the first embodiment of the present invention.
Figure 12:
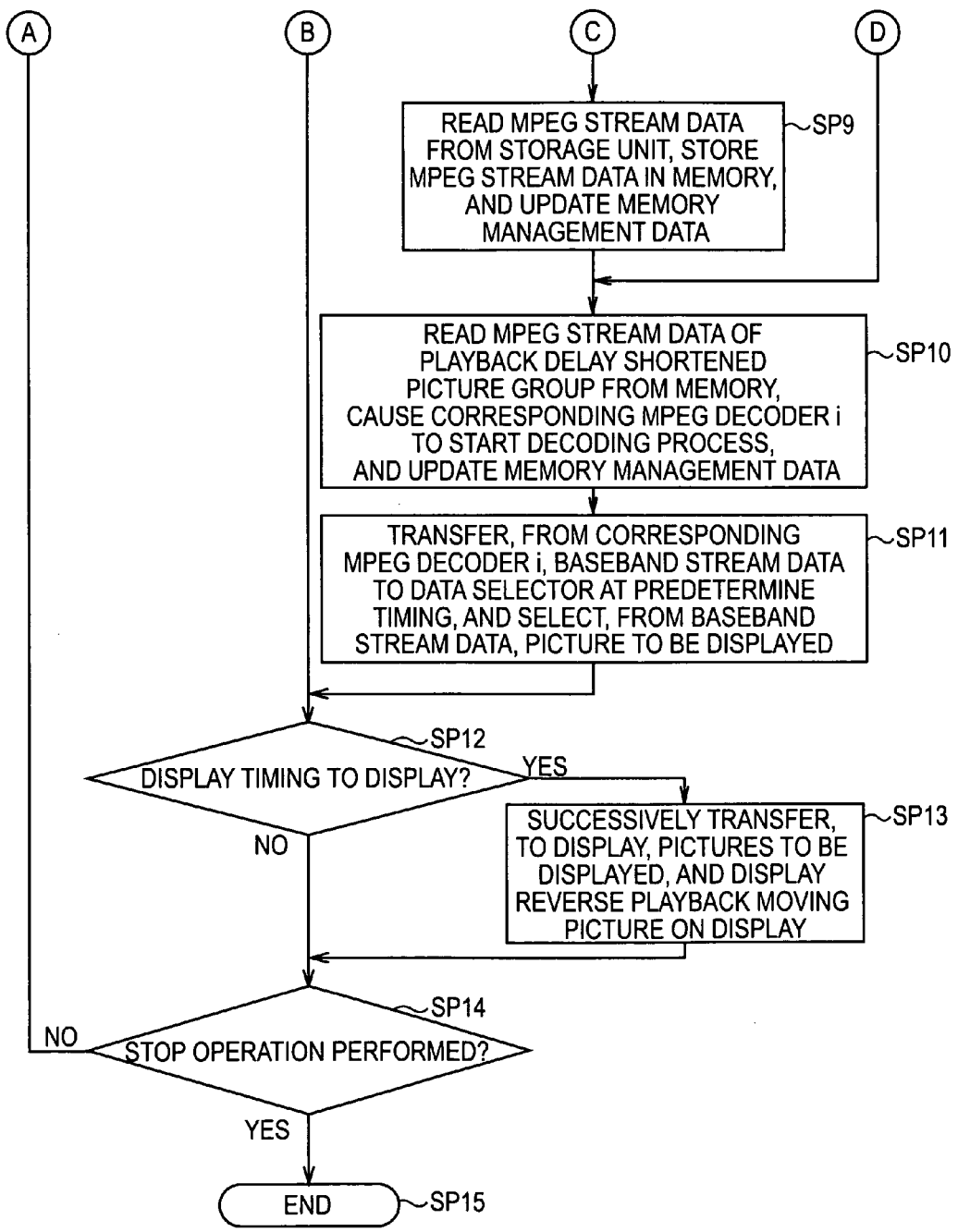
FIG. 12 is a continuation of the flowchart of FIG. 11.

The controller 5 performs a reverse playback process RT1 of FIGS. 11 and 12 in accordance with a control program stored in the ROM 5A in the controller 5.

When the user operates the operation unit 3 to specify an AV content to be played back, a playback speed of the AV content, and a reverse playback operation, the controller 5 starts the reverse playback process RT1 with step SP0. In step SP1, the controller 5 determines a picture to start with in the reverse playback operation. In accordance with the present embodiment, the picture in the reverse playback operation is a picture P15 of the 0th GOP(0), for example.

In step SP2, the controller 5 calculates and determines a picture to be displayed in response to a playback speed specified by the user. For example, if the ×2 speed is specified, the controller 5 determines pictures P15, B13, B11, P9, B7, B5, I3, and B1 of the GOP as pictures to be displayed as shown in FIG. 8.

In step SP3, the controller 5 calculates the MPEG stream data D1 of each playback delay shortened picture group PDS in response to a combination of one of the I picture and the P picture determined in step SP3 as being the one to be displayed, a picture needing decoding prior to the decoding process, and a B picture referenced by the one of the I picture and the P picture while at the same time rearranging the display order to the reverse direction.

For example, if the ×2 reverse playback speed is specified, the controller 5 calculates, as shown in the portion (B) of FIG. 8, the picture P15 of the 0th GOP(0) determined as being a P picture to be displayed, pictures I3, P6, P9, and P12 of the 0th GOP(0) required to decode the picture P15 of the 0th GOP(0), and the picture B13 of the 0th GOP(0) referenced by the one of the I picture and the P picture to be displayed.

In step SP4, the controller 5 sets a display start time of a reverse playback moving image. In steps SP5 and SP6, the controller 5 calculates the start timing of the playback delay shortened picture group PDS calculated in step SP3.

More specifically, in step SP5, the controller 5 displays the starting picture selected in step SP1 at the display start time set in step SP4. To display the pictures in the order determined in step SP2, the controller 5 calculates timing at which the decoding process of the MPEG stream data D1 of the playback delay shortened picture group PDS needs to be completed.

When the reverse playback moving image is displayed as in the portion (G) of FIG. 8, the decoding process of the picture B13 needs to be completed before the displaying of the picture B13 of the 0th GOP(0) starts. The timing of the displaying of the picture B13 of the 0th GOP(0) becomes the latest end timing of the decoding process of the playback delay shortened picture group PDS. The controller 5 thus calculates the start timing of the displaying of the picture B13 as the end timing of the decoding process of the playback delay shortened picture group PDS.

Similarly, the controller 5 calculates the end timing of the decoding process of the playback delay shortened picture group PDS to display the reverse playback moving image as shown in the portion (G) of FIG. 8.

In step SP6, the controller 5 calculates the start timing of the playback delay shortened picture group PDS based on the end timing of the decoding process of the playback delay shortened picture group PDS and the decoding period of time multiplied by the number of pictures of the playback delay shortened picture group PDS to be decoded. The controller 5 then determines the MPEG decoders to be used from among the first through fifth MPEG decoders 10A through 10E. The controller 5 then determines how to distribute the MPEG stream data D1 of the playback delay shortened picture group PDS among the first through fifth MPEG decoders 10A through 10E. If the playback delay shortened picture group PDS is distributed among a plurality of MPEG decoders in the order of generation of the playback delay shortened picture group PDS, the plurality of MPEG decoders may fail to complete the decoding process in time. In such a case, the MPEG stream data D1 of the playback delay shortened picture group PDS is rearranged.

As shown in the portion (B) of FIG. 8, the number of pictures of the playback delay shortened picture group PDS including the picture B13 of the 0th GOP(0) to be decoded is six. The start timing of the decoding process of the playback delay shortened picture group PDS is six frames earlier than the end timing of the decoding process of the MPEG stream data D1 of the playback delay shortened picture group PDS.

If the ×2 speed is specified, the five MPEG decoders, namely, the first through fifth MPEG decoders 10A through 10E are determined as the MPEG decoders to be used as previously discussed with reference to the portions (B) through (F) of FIG. 8. As shown in the portions (B) through (F) of FIG. 8, the controller 5 determines how to distribute the MPEG stream data D1 among the first through fifth MPEG decoders 10A through 10E on a per playback delay shortened picture group PDS basis.

In step SP7, the controller 5 determines whether it is time for each of the first through fifth MPEG decoders 10A through 10E to start the decoding process on respective distributed playback delay shortened picture group PDS. If the answer to the determination in step SP7 is no, processing proceeds to step SP12. If the answer to the determination in step SP7 is yes, processing proceeds to step SP8. The controller 5 references a write status of the MPEG stream data D1 in the memory 9 in the controller 5, and memory management data managing a write address, and determines whether MPEG stream data D1 of the GOP containing the picture to be displayed is stored in the memory 9. If the answer to the determination in step SP8 is yes, processing proceeds to step SP10. If the answer to the determination in step SP8 is no, processing proceeds to step SP9. The controller 5 controls the storage unit 2 to read the MPEG stream data D1 of the GOP into the memory controller 6 before the start of the decoding process of the picture to be displayed. The controller 5 controls the memory controller 6 to determine a memory write address of the MPEG stream data D1 of the GOP, and then to store the MPEG stream data D1 at the determined address in the memory 9. The controller 5 updates the memory management data in accordance with the memory write address.

If a read process is performed at the ×2 speed with no MPEG stream data D1 stored in the memory 9, the read process of the picture P15 needs to be completed in the fifth MPEG decoder 10E before the start timing of the decoding process of the picture P15 of minus first GOP(−1) as shown in the portion (F) of FIG. 8. The start timing of the decoding process is the latest process timing of the selected baseband data stream D3 of the playback delay shortened picture group PDS containing the picture P15. The controller 5 calculates the read timing of the MPEG stream data D1 with respect to the start timing of the decoding process, starts the read process, and then stores the MPEG stream data D1 onto the memory 9.

In step SP10, the controller 5 controls the memory controller 6, thereby reading the MPEG stream data D1 of the playback delay shortened picture group PDS corresponding to a memory read address onto the data distributor 7. The controller 5 controls the data distributor 7, thereby distributing the MPEG stream data D1 of the playback delay shortened picture group PDS among the first through fifth MPEG decoders 10A through 10E in the MPEG decoder block 10. The first through fifth MPEG decoders 10A through 10E start the decoding process. The controller 5 controls the memory controller 6 to update the memory management data in response to the memory read address when the decoding process of the MPEG stream data D1 of the GOP containing the picture to be displayed is completed.

As shown in the portions (B) through (F) of FIG. 8, the MPEG stream data D1 of the playback delay shortened picture group PDS is successively distributed among the first through fifth MPEG decoders 10A through 10E in the MPEG decoder block 10 at the start timing of the decoding process of the playback delay shortened picture group PDS. The first through fifth MPEG decoders 10A through 10E start the decoding process.

In step SP11, the controller 5 controls the MPEG decoder block 10 to output the pictures of the baseband stream data D2 to the data selector 8 at the predetermined timing. By controlling the data selector 8, the controller 5 selects the pictures of the baseband stream data D2 to be displayed in accordance with the display order to the display 11.

For example, as shown in the portion (B) of FIG. 8, the data selector 8 selects the picture P15 and the picture B13 of the 0th GOP(0), as the pictures of the baseband stream data D2 of the playback delay shortened picture group PDS supplied from the first MPEG decoder 10A and to be displayed. The data selector 8 further successively selects pictures to be displayed from the baseband stream data D2 of the playback delay shortened picture group PDS. As a result, the pictures to be displayed are rearranged in a reverse display order.

In step SP12, the controller 5 determines whether it is time to display the pictures. The answer to the determination in step S12 is no, processing proceeds to step S14. The answer to the determination in step S12 is yes, processing proceeds to step SP13. The controller 5 outputs the pictures to the display 11. As a result, a reverse playback moving image responsive to the pictures to be displayed is displayed on the display 11.

In response to the operational signal S1 from the operation unit 3, the controller 5 determines in step SP14 whether an operational input to stop the reverse playback operation (hereinafter operation stop command) has been received from the user. The answer to the determination in step SP14 is no, processing returns to step SP7 to repeat steps SP7 through SP14. In response to the affirmative answer to the determination in step SP14, processing to step SP15 to end the reverse playback process RT1.

By controlling the storage unit 2, the memory controller 6, the data distributor 7, the data selector 8, and the MPEG decoder block 10, the controller 5 displays an AV content as the reverse playback moving image on the display 11 at a reverse playback speed specified.

In the playback apparatus 1, the MPEG stream data D1 of the AV content specified by the user is read from the storage unit 2 at the specified playback speed. The playback delay shortened picture group PDS composed of the picture to be displayed and the picture required to decode the picture is distributed among the first through fifth MPEG decoders 10A through 10E. The first through fifth MPEG decoders 10A through 10E perform the decoding process in parallel.

Based on the principle discussed with reference to FIG. 5, the playback apparatus 1 shortens the playback delay from the start of the decoding process of the picture to the displaying of the picture.

The playback apparatus 1 produces the playback delay shortened picture group PDS from a combination of one of an I picture and a P picture for displaying the playback delay shortened picture group PDS, a picture required to decode the one of the I picture and the P picture, and a B picture referenced by the one of the I picture and the P picture. The playback delay shortened picture group PDS is then distributed among the first through fifth MPEG decoders 10A through 10E. The first through fifth MPEG decoders 10A through 10E perform the decoding process in parallel. Efficiency of the decoding process of the playback apparatus 1 is thus improved.

The MPEG stream data D1 of the AV content specified by the user is read from the storage unit 2 at the specified playback speed. The MPEG stream data D1 is distributed among the first through fifth MPEG decoders 10A through 10E on a per playback delay shortened picture group PDS unit basis. The playback delay shortened picture group PDS unit includes the picture to be displayed and the picture required to decode the picture to be displayed. The plurality of decoding processors, namely, the first through fifth MPEG decoders 10A through 10E perform the decoding process in parallel. Based on the principle described with reference to FIG. 5, the delay time from the start of the decoding process of the picture to the displaying of the picture is shortened. The playback apparatus provides improved response characteristics in the reverse playback operation of the MPEG stream data.

Figure 13:
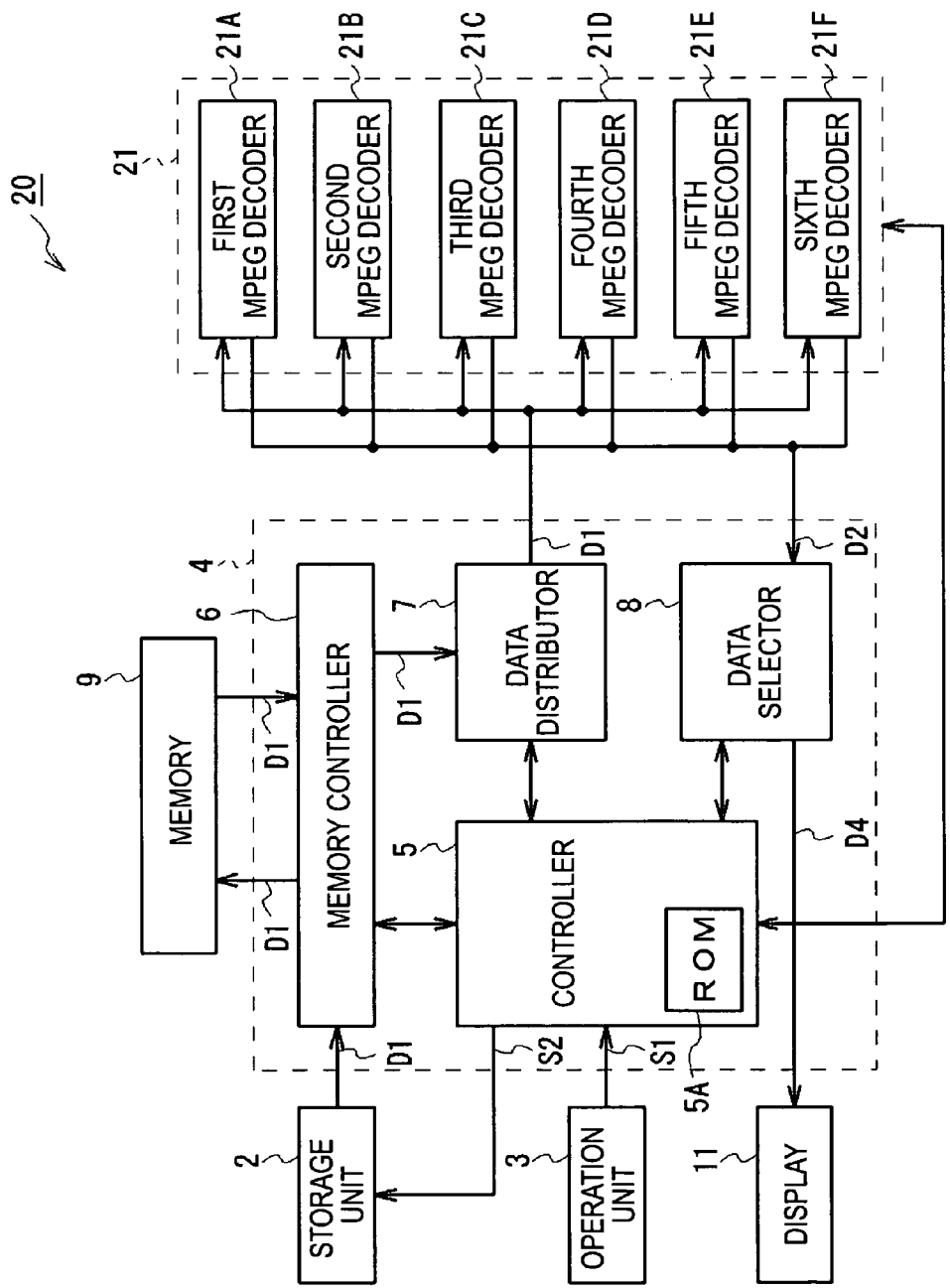
FIG. 13 is a block diagram of a playback apparatus in accordance with a second embodiment of the present invention.

FIG. 13 illustrates a playback apparatus 20 of a second embodiment of the present invention. Elements identical to those described with reference to FIG. 6 are designated with the same reference numerals. The number of MPEG decoders in a MPEG decoding block 21 in playback apparatus 20 is different from the number of MPEG decoders in the MPEG decoding unit 10 in the playback apparatus 1 of FIG. 6 of the first embodiment of the present invention. In the playback apparatus 20, the data selector 8 selects and synthesizes the baseband stream data. The rest of the playback apparatus 20 remains identical in structure and function to the playback apparatus 1. The MPEG decoding block 21 includes six MPEG decoders, namely, first through sixth MPEG decoders 21A through 21F.

The data selector 8, under the control of the controller 5, performs a synthesis process to select, on a field-by-field basis, a field of the picture from the baseband stream data D2 supplied from each of the first through sixth MPEG decoders 21A through 21F and to synthesize the fields so that the intervals between the fields is equalized. At the same time, the data selector 8 performs effect process on the baseband stream data D2. The data selector 8 outputs the resulting baseband stream data D4 to the display 11. As a result, an interlace moving image results.

The specific process of the playback apparatus 20 during a field-by-field reverse playback operation is described below.

During an ×1 speed reverse playback process, the storage unit successively reads the MPEG stream data D1 of the specified AV content at an ×1 speed on a per GOP basis as shown in a portion (A) of FIG. 14, transfers the MPEG stream data D1 to the memory controller 6, and stores the MPEG stream data D1 onto the memory 9.

In response to the MPEG stream data D1 stored on the memory 9, the memory controller 6 under the control of the controller 5 successively generates the MPEG stream data D1 of the playback delay shortened picture group PDS described with reference to FIG. 5 while rearranging the display order to the reverse direction. The memory controller 6 outputs the MPEG stream data D1 to the data distributor 7 at the final playback image output timing.

The data distributor 7, under the control of the controller 5, distributes the MPEG stream data D1 of the playback delay shortened picture group PDS among the first through sixth MPEG decoders 21A through 21F.

As shown in portions (B) through (F) of FIG. 14, the first through sixth MPEG decoders 21A through 21F successively decode the MPEG stream data D1 at predetermined timings at an ×1 speed reverse playback operation as previously discussed with reference to the first embodiment of the present invention, and successively transfer the resulting baseband stream data D2 to the data selector 8.

As shown in the portion (G) of FIG. 14, the data selector 8 starts a selection process a period of five frames after the start of the decoding process of the first MPEG decoder 21A of decoding a picture I3 of the 0th GOP(0). Specifically, the data selector 8 under the control of the controller 5 selects pictures to be displayed of the baseband stream data D2 provided from the first through sixth MPEG decoders 21A through 21F. More specifically, the data selector 8 selects pictures P15, B14, and B13 of the 0th GOP(0) from the baseband stream data D2 supplied from the first MPEG decoder 21A, pictures P12, B11, and B10 of the 0th GOP(0) from the baseband stream data D2 supplied from the second MPEG decoder 21B, pictures P9, B8, and B7 of the 0th GOP(0) from the baseband stream data D2 supplied from the third MPEG decoder 21C, pictures P6, B5, and B4 of the 0th GOP(0) from the baseband stream data D2 supplied from the fourth MPEG decoder 21D, and pictures I3, B1, and B2 of the 0th GOP(0) from the baseband stream data D2 supplied from the fifth MPEG decoder 21E.

Figure 15A:
FIGS. 15A and 15B illustrates a synthesis process of the playback apparatus during an ×1 speed playback operation in accordance with the second embodiment of the present invention.
Figure 15B:
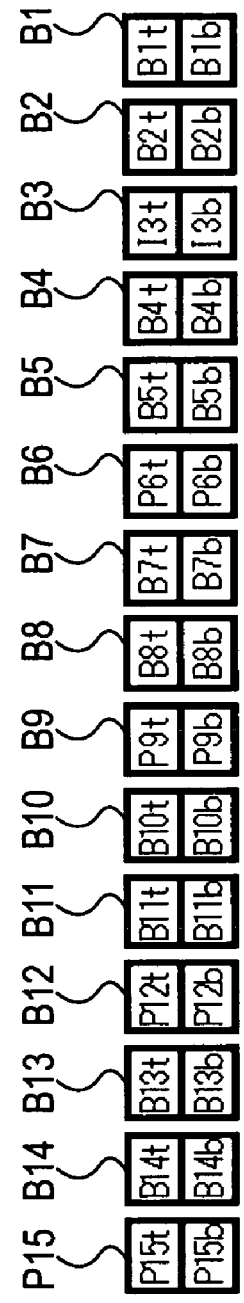

During the ×1 reverse playback operation, the data selector 8 selects, from the baseband stream data D2, a field P15$b$, as an in-picture bottom field of a picture P15 to be displayed first, and a field B14$b$, as an in-picture bottom field of a picture B14 to be displayed next, as shown FIG. 15B, which is a detailed view of FIG. 15A, and shifts the field P15$b$ and the field B14$b$ in the center of gravity thereof into the top fields of a synthesized image as shown in the portion (G) of FIG. 14. The data selector 8 selects a field P15$t$ of the picture P15 so that the field intervals between the top fields of the synthesized image are equalized. As shown in the portion (G) of FIG. 14, the data selector 8 shifts the field P15$t$ of the picture P15 in the center of gravity thereof into a bottom field of the synthesized image to be displayed as the bottom field of the synthesized image. More specifically, the field P15$b$ of the picture P15 and the field P15$t$ of the picture P15 are reversed to generate the synthesized image. Similarly, synthesized images are successively generated. Effect process is performed on the synthesized image as necessary. The baseband stream data D4 thus obtained is output to the display 11.

The playback apparatus 20 generates the synthesized baseband stream data D4 and displays an ×1 speed reverse playback moving image responsive to the synthesized baseband stream data D4 on the display 11. The playback apparatus 20 needs only a period of five frames from the start of the decoding process of the picture I3 of the 0th GOP(0) to the displaying of the picture P15 of the 0th GOP(0).

During an ×2 speed reverse playback process, the storage unit 2 successively reads the MPEG stream data D1 of the specified AV content at an ×2 speed on a per GOP basis as shown in a portion (A) of FIG. 16, transfers the MPEG stream data D1 to the memory controller 6, and stores the MPEG stream data D1 onto the memory 9.

In response to the MPEG stream data D1 stored on the memory 9, the memory controller 6 under the control of the controller 5 successively generates the MPEG stream data D1 of the playback delay shortened picture group PDS described with reference to FIG. 5 while rearranging the display order to the reverse direction. The memory controller 6 outputs the MPEG stream data D1 to the data distributor 7 at the final playback image output timing.

The data distributor 7, under the control of the controller 5, distributes the MPEG stream data D1 of the playback delay shortened picture group PDS among the first through sixth MPEG decoders 21A through 21F. The MPEG stream data D1 of a (6k−5)-th playback delay shortened picture group PDS is distributed to the first MPEG decoder 21A (k=1, 2, . . . ). The MPEG stream data D1 of a (6k−4)-th playback delay shortened picture group PDS is distributed to the second MPEG decoder 21B. The MPEG stream data D1 of a (6k−3)-th playback delay shortened picture group PDS is distributed to the third MPEG decoder 21C. The MPEG stream data D1 of a (6k−2)-th playback delay shortened picture group PDS is distributed to the fourth MPEG decoder 21D. The MPEG stream data D1 of a (6k−1)-th playback delay shortened picture group PDS is distributed to the fifth MPEG decoder 21E. The MPEG stream data D1 of a 6k-th playback delay shortened picture group PDS is distributed to the sixth MPEG decoder 21F.

The first MPEG decoder 21A starts decoding the MPEG stream data D1 of the playback delay shortened picture group PDS supplied from the data distributor 7 as shown in a portion (B) of FIG. 16, at the timing the encoded data of the picture B10 of the 0th GOP(0) is read from the storage unit 2. The first MPEG decoder 21A successively decodes the encoded data (MPEG stream data D1) of each picture in the playback delay shortened picture group PDS. The first MPEG decoder 21A further decodes the MPEG stream data D1 of the subsequently supplied playback delay shortened picture group PDS at predetermined timings, and then outputs the resulting baseband stream data D2 to the data selector 8.

The second MPEG decoder 21B starts decoding the MPEG stream data D1 of the playback delay shortened picture group PDS supplied from the data distributor 7 as shown in a portion (C) of FIG. 16, at the timing the first MPEG decoder 21A starts decoding the picture P9 of the 0th GOP(0). The second MPEG decoder 21B successively decodes the encoded data (MPEG stream data D1) of each picture in the playback delay shortened picture group PDS. The second MPEG decoder 21B further decodes the MPEG stream data D1 of the subsequently supplied playback delay shortened picture group PDS at predetermined timings, and then outputs the resulting baseband stream data D2 to the data selector 8.

The third MPEG decoder 21C starts decoding the MPEG stream data D1 of the playback delay shortened picture group PDS supplied from the data distributor 7 as shown in a portion (D) of FIG. 16, at the timing the second MPEG decoder 21B starts decoding the picture P12 of the 0th GOP(0). The third MPEG decoder 21C successively decodes the encoded data (MPEG stream data D1) of each picture in the playback delay shortened picture group PDS. The third MPEG decoder 21C further decodes the MPEG stream data D1 of the subsequently supplied playback delay shortened picture group PDS at predetermined timings, and then outputs the resulting baseband stream data D2 to the data selector 8.

The fourth MPEG decoder 21D starts decoding the MPEG stream data D1 of the playback delay shortened picture group PDS supplied from the data distributor 7 as shown in a portion (E) of FIG. 16, at the timing the third MPEG decoder 21C starts decoding the picture P9 of the 0th GOP(0). The fourth MPEG decoder 21D successively decodes the encoded data (MPEG stream data D1) of each picture in the playback delay shortened picture group PDS. The fourth MPEG decoder 21D further decodes the MPEG stream data D1 of the subsequently supplied playback delay shortened picture group PDS at predetermined timings, and then outputs the resulting baseband stream data D2 to the data selector 8.

The fifth MPEG decoder 21E starts decoding the MPEG stream data D1 of the playback delay shortened picture group PDS supplied from the data distributor 7 as shown in a portion (F) of FIG. 16, at the timing the fourth MPEG decoder 21D starts decoding the picture I3 of the 0th GOP(0). The fifth MPEG decoder 21E successively decodes the encoded data (MPEG stream data D1) of each picture in the playback delay shortened picture group PDS. The fifth MPEG decoder 21E further decodes the MPEG stream data D1 of the subsequently supplied playback delay shortened picture group PDS at predetermined timings, and then outputs the resulting baseband stream data D2 to the data selector 8.

The sixth MPEG decoder 21F starts decoding the MPEG stream data D1 of the playback delay shortened picture group PDS supplied from the data distributor 7 as shown in a portion (G) of FIG. 16, at the timing the fifth MPEG decoder 21E starts decoding the picture P9 of the minus first GOP(−1). The sixth MPEG decoder 21F successively decodes the encoded data (MPEG stream data D1) of each picture in the playback delay shortened picture group PDS. The sixth MPEG decoder 21F further decodes the MPEG stream data D1 of the subsequently supplied playback delay shortened picture group PDS at predetermined timings, and then outputs the resulting baseband stream data D2 to the data selector 8.

As shown in the portion (H) of FIG. 16, the data selector 8 starts a selection process a period of six frames after the start of the decoding process of the first MPEG decoder 21A of decoding a picture I3 of the 0th GOP(0). Specifically, the data selector 8, under the control of the controller 5, selects pictures to be displayed from the baseband stream data D2 supplied from the first through sixth MPEG decoders 21A through 21F. More specifically, the data selector 8 selects pictures P15, B14, and B13 of the 0th GOP(0) from the baseband stream data D2 supplied from the first MPEG decoder 21A, pictures P12, B11, and B10 of the 0th GOP(0) from the baseband stream data D2 supplied from the second MPEG decoder 21B, pictures P9, B8, and B7 of the 0th GOP(0) from the baseband stream data D2 supplied from the third MPEG decoder 21C, pictures P6, B5, and B4 of the 0th GOP(0) from the baseband stream data D2 supplied from the fourth MPEG decoder 21D, pictures I3, B2, and B1 of the 0th GOP(0) from the baseband stream data D2 supplied from the fifth MPEG decoder 21E, and pictures P15, B14, and B13 of the minus first GOP(−1) from the baseband stream data D2 supplied from the sixth MPEG decoder 21F.

Figure 17A:
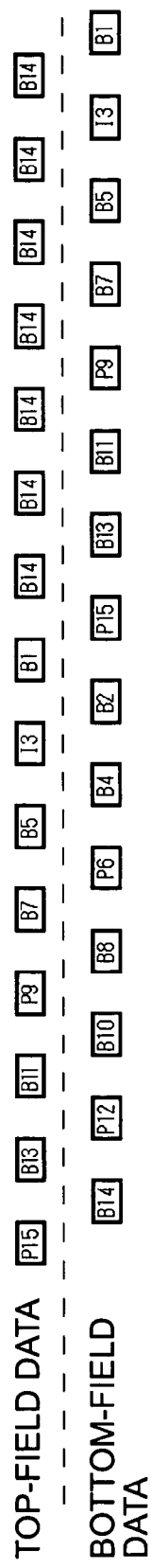
FIGS. 17A and 17B illustrate a synthesis process of the playback apparatus during an ×2 speed playback operation.
Figure 17B:
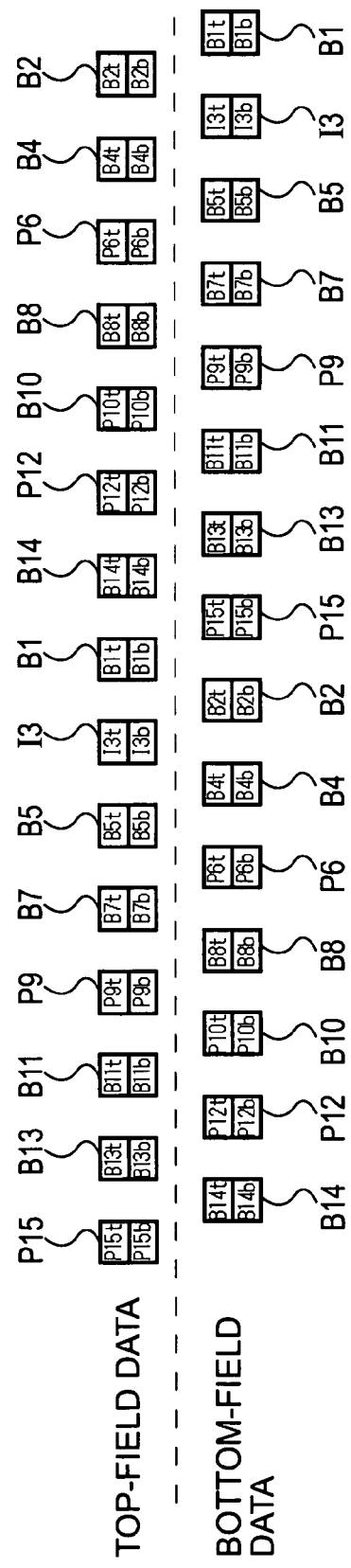

During the ×2 reverse playback operation, the data selector 8 selects, from the baseband stream data D2, a field P15$b$, as an in-picture bottom field of a picture P15 to be displayed first, and a field B13$b$, as an in-picture bottom field of a picture B14 to be displayed next, as shown FIG. 17B, which is a detailed view of FIG. 17A, and shifts the field P15$b$ and the field B13$b$ in the center of gravity thereof into the top fields of a synthesized image as shown in the portion (G) of FIG. 16. The data selector 8 selects a field B14$b$ of the picture B14 shown in the lower side of FIG. 17B so that the field intervals between the top fields of the synthesized image are equalized. The data selector 8 thus generates the synthesized image so that the field B14$b$ of the picture is displayed as a synthesized image bottom field. The synthesized images are thus successively generated. Effect process is performed on the synthesized image as necessary. The baseband stream data D4 thus obtained is output to the display 11.

The playback apparatus 20 generates the synthesized baseband stream data D4 and displays an ×2 speed reverse playback moving image responsive to the synthesized baseband stream data D4 on the display 11. The playback apparatus 20 needs only a period of six frames from the start of the decoding process of the picture I3 of the 0th GOP(0) to the displaying of the picture P15 of the 0th GOP(0).

Figure 18:
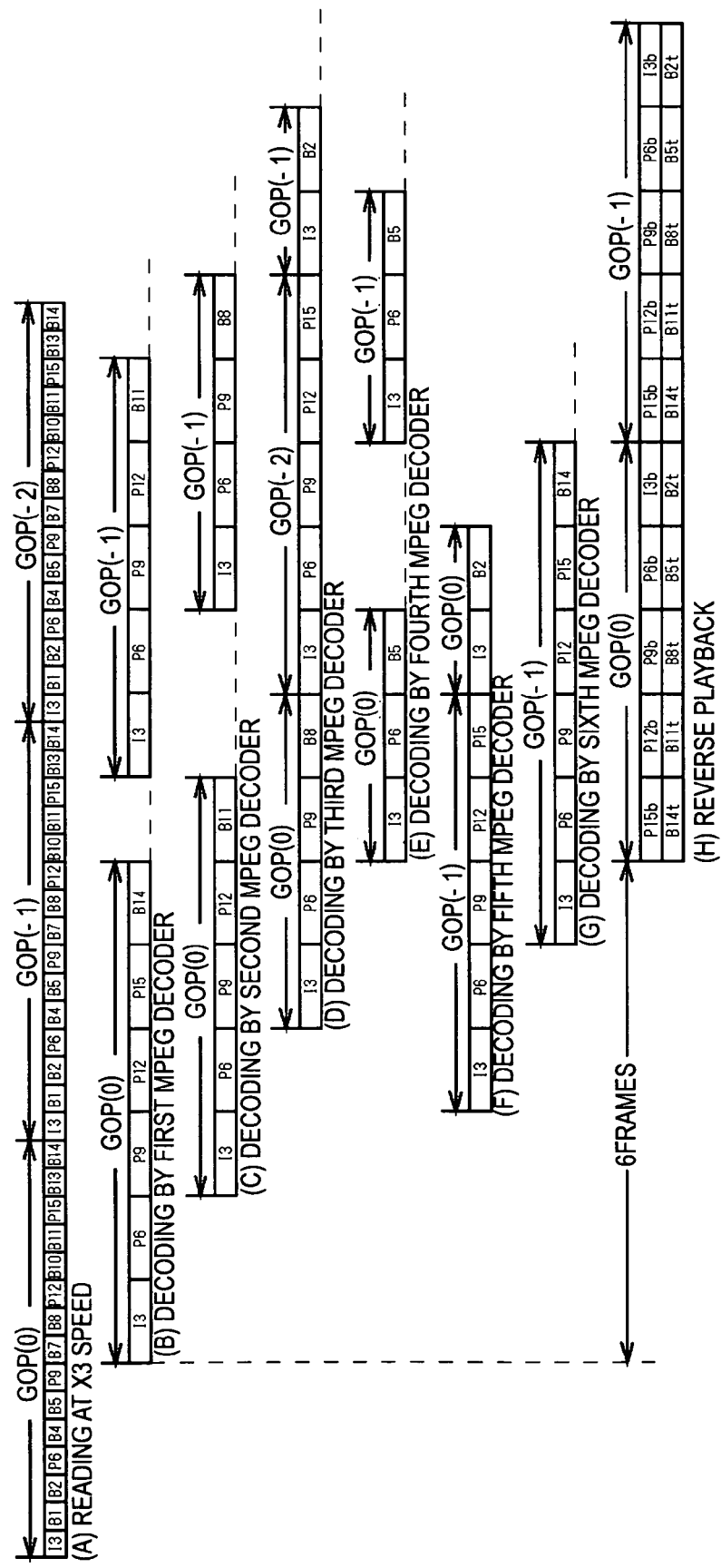
FIG. 18 is a timing diagram illustrating a synthesis process of the playback apparatus during an ×3 speed playback operation in accordance with the second embodiment of the present invention.

During an ×3 speed reverse playback process, the storage unit 2 successively reads the MPEG stream data D1 of the specified AV content at an ×3 speed on a per GOP basis as shown in a portion (A) of FIG. 18, transfers the MPEG stream data D1 to the memory controller 6, and stores the MPEG stream data D1 onto the memory 9.

In response to the MPEG stream data D1 stored on the memory 9, the memory controller 6 under the control of the controller 5 successively generates the MPEG stream data D1 of the playback delay shortened picture group PDS described with reference to FIG. 5 while rearranging the display order to the reverse direction. The memory controller 6 outputs the MPEG stream data D1 to the data distributor 7 at the final playback image output timing.

The data distributor 7, under the control of the controller 5, distributes the MPEG stream data D1 of the playback delay shortened picture group PDS among the first through sixth MPEG decoders 21A through 21F.

The data distributor 7, under the control of the controller 5, can perform the distribution operation with a playback delay shortened picture group PDS taking a longer time interchanged in position with a preceding playback delay shortened picture group PDS.

The first MPEG decoder 21A starts decoding the MPEG stream data D1 of the playback delay shortened picture group PDS supplied from the data distributor 7 as shown in a portion (B) of FIG. 18, at the timing the encoded data of the picture B7 of the 0th GOP(0) is read from the storage unit 2. The first MPEG decoder 21A successively decodes the encoded data (MPEG stream data D1) of each picture in the playback delay shortened picture group PDS. The first MPEG decoder 21A further decodes the MPEG stream data D1 of the subsequently supplied playback delay shortened picture group PDS at predetermined timings, and then outputs the resulting baseband stream data D2 to the data selector 8.

The second MPEG decoder 21B starts decoding the MPEG stream data D1 of the playback delay shortened picture group PDS supplied from the data distributor 7 as shown in a portion (C) of FIG. 18, at the timing the first MPEG decoder 21A starts decoding the picture P9 of the 0th GOP(0). The second MPEG decoder 21B successively decodes the encoded data (MPEG stream data D1) of each picture in the playback delay shortened picture group PDS. The second MPEG decoder 21B further decodes the MPEG stream data D1 of the subsequently supplied playback delay shortened picture group PDS at predetermined timings, and then outputs the resulting baseband stream data D2 to the data selector 8.

The third MPEG decoder 21C starts decoding the MPEG stream data D1 of the playback delay shortened picture group PDS supplied from the data distributor 7 as shown in a portion (D) of FIG. 18, at the timing the second MPEG decoder 21B starts decoding the picture P9 of the 0th GOP(0). The third MPEG decoder 21C successively decodes the encoded data (MPEG stream data D1) of each picture in the playback delay shortened picture group PDS. The third MPEG decoder 21C further decodes the MPEG stream data D1 of the subsequently supplied playback delay shortened picture group PDS at predetermined timings, and then outputs the resulting baseband stream data D2 to the data selector 8.

The fourth MPEG decoder 21D starts decoding the MPEG stream data D1 of the playback delay shortened picture group PDS supplied from the data distributor 7 as shown in a portion (E) of FIG. 18, at the timing the third MPEG decoder 21C starts decoding the picture P9 of the 0th GOP(0). The fourth MPEG decoder 21D successively decodes the encoded data (MPEG stream data D1) of each picture in the playback delay shortened picture group PDS. The fourth MPEG decoder 21D further decodes the MPEG stream data D1 of the subsequently supplied playback delay shortened picture group PDS at predetermined timings, and then outputs the resulting baseband stream data D2 to the data selector 8.

The fifth MPEG decoder 21E starts decoding the MPEG stream data D1 of the playback delay shortened picture group PDS supplied from the data distributor 7 as shown in a portion (F) of FIG. 18, at the timing three frames before the fourth MPEG decoder 21D starts decoding the picture I3 of the 0th GOP(0). The fifth MPEG decoder 21E successively decodes the encoded data (MPEG stream data D1) of each picture in the playback delay shortened picture group PDS. The fifth MPEG decoder 21E further decodes the MPEG stream data D1 of the subsequently supplied playback delay shortened picture group PDS at predetermined timings, and then outputs the resulting baseband stream data D2 to the data selector 8.

The sixth MPEG decoder 21F starts decoding the MPEG stream data D1 of the playback delay shortened picture group PDS supplied from the data distributor 7 as shown in a portion (G) of FIG. 18, at the timing the fifth MPEG decoder 21E starts decoding the picture P9 of the minus first GOP(−1). The sixth MPEG decoder 21F successively decodes the encoded data (MPEG stream data D1) of each picture in the playback delay shortened picture group PDS. The sixth MPEG decoder 21F further decodes the MPEG stream data D1 of the subsequently supplied playback delay shortened picture group PDS at predetermined timings, and then outputs the resulting baseband stream data D2 to the data selector 8.

As shown in the portion (G) of FIG. 18, the data selector 8 starts a selection process a period of six frames after the start of the decoding process of the first MPEG decoder 21A of decoding a picture I3 of the 0th GOP(0). Specifically, the data selector 8, under the control of the controller 5, selects pictures to be displayed from the baseband stream data D2 supplied from the first through sixth MPEG decoders 21A through 21F. More specifically, the data selector 8 selects pictures P15 and B14 of the 0th GOP(0) from the baseband stream data D2 supplied from the first MPEG decoder 21A, pictures P12 and B11 of the 0th GOP(0) from the baseband stream data D2 supplied from the second MPEG decoder 21B, pictures P9 and B8 of the 0th GOP(0) from the baseband stream data D2 supplied from the third MPEG decoder 21C, pictures P6 and B5 of the 0th GOP(0) from the baseband stream data D2 supplied from the fourth MPEG decoder 21D, pictures I3 and B2 of the 0th GOP(0) from the baseband stream data D2 supplied from the fifth MPEG decoder 21E, and pictures P15 and B14 of the 0th GOP(0) from the baseband stream data D2 supplied from the sixth MPEG decoder 21F.

Figure 19A:
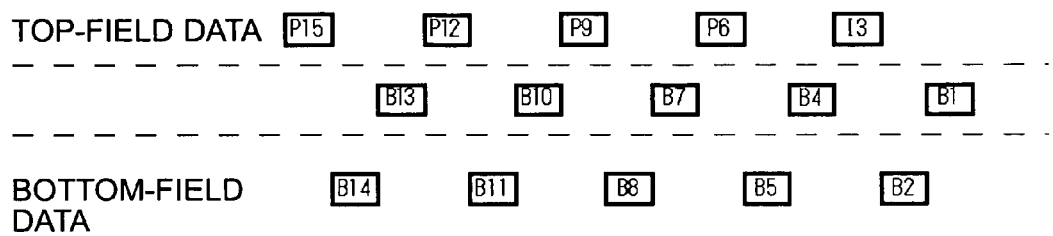
FIGS. 19A and 19B illustrate a synthesis process of the playback apparatus during ×3 speed playback operation in accordance with the second embodiment of the present invention.
Figure 19B:
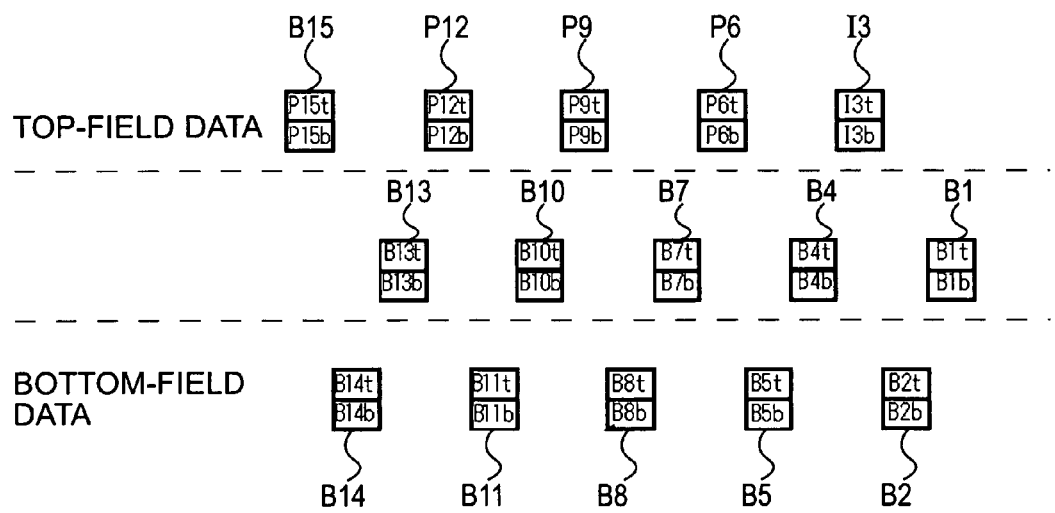

During the ×2 reverse playback operation, the data selector 8 selects, from the baseband stream data D2, a field P15$b$, as an in-picture bottom field of a picture P15 to be displayed first (in top-field data), and a field P12$b$, as an in-picture bottom field of a picture B12 to be displayed next (in the top-field data), as shown FIG. 19B, which is a detailed view of FIG. 19A, and shifts the field P15$b$ and the field P12$b$ in the center of gravity thereof into the top fields of a synthesized image as shown in the portion (G) of FIG. 16. The data selector 8 selects a field B14$t$ of the picture B14 shown in the lower side of FIG. 19B so that the field intervals between the top fields of the synthesized image are equalized. The data selector 8 thus generates the synthesized image so that the field B14$b$ of the picture is displayed as a synthesized image bottom field. As shown in the portion (G) of FIG. 18, a field B14$t$ of the picture B14 is shifted in the center of gravity thereof into a bottom field of the synthesized image so that the field B14$t$ of the picture B14 is displayed as a bottom field. The synthesized images are thus successively generated. Effect process is performed on the synthesized image as necessary. The baseband stream data D4 thus obtained is output to the display 11.

The playback apparatus 20 generates the synthesized baseband stream data D4 and displays an ×3 speed reverse playback moving image responsive to the synthesized baseband stream data D4 on the display 11. The playback apparatus 20 needs only a period of six frames from the start of the decoding process of the picture I3 of the 0th GOP(0) to the displaying of the picture P15 of the 0th GOP(0).

Figure 20:
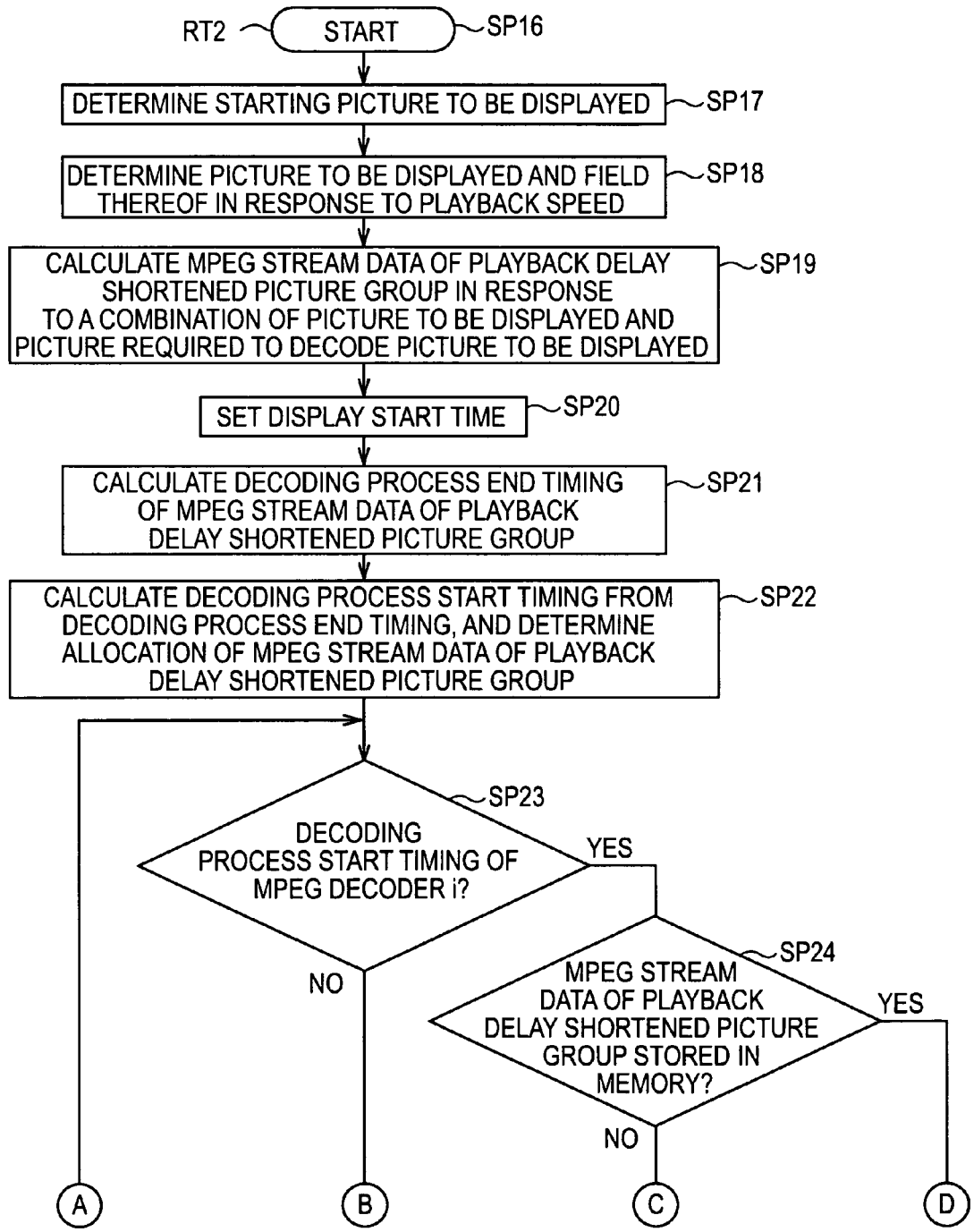
FIG. 20 is a flowchart illustrating a reverse playback process performed on a per field basis in accordance with the second embodiment of the present invention.
Figure 21:
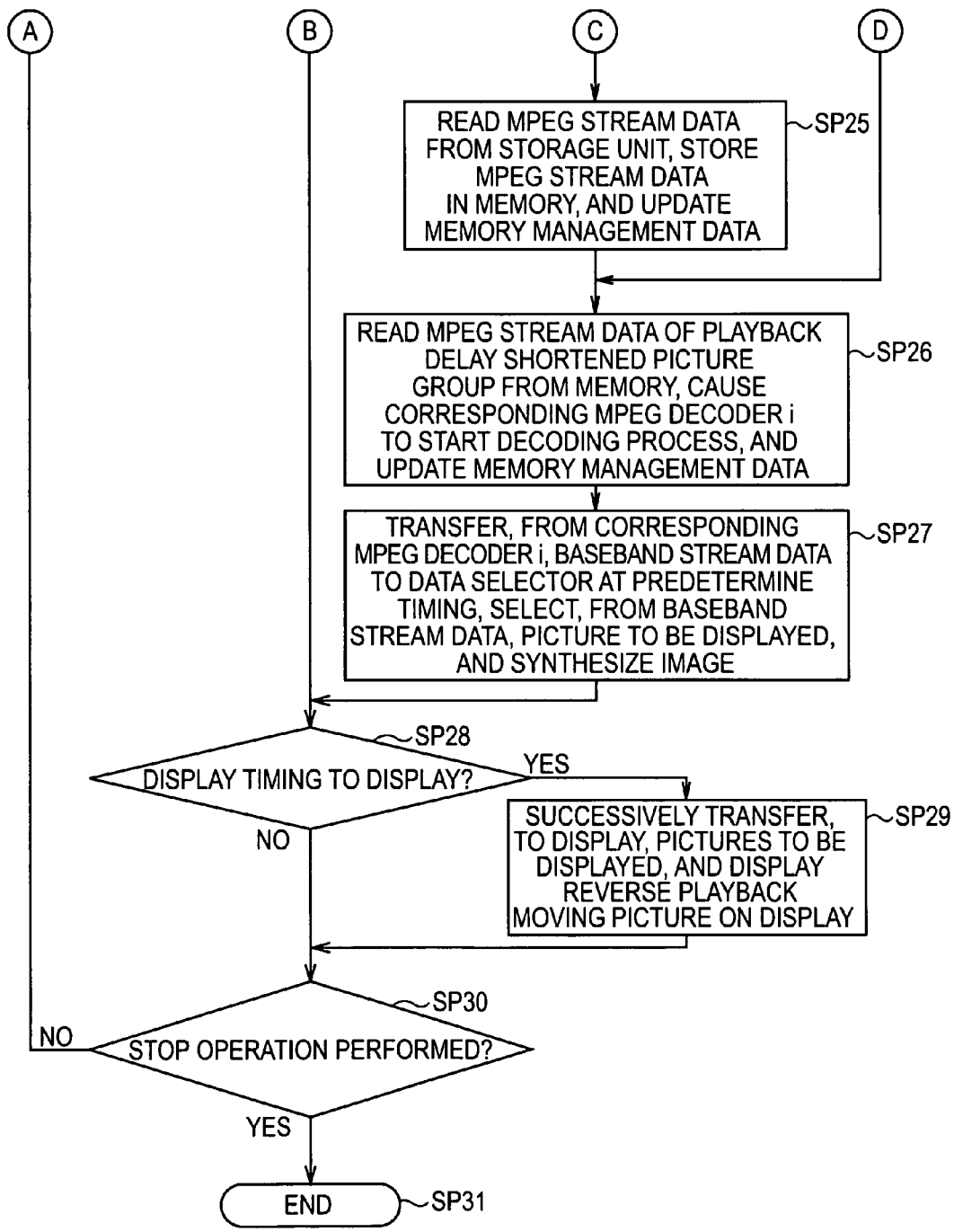
FIG. 21 is a continuation of the flowchart of FIG. 20.

The controller 5 performs the above-referenced field-by-field reverse playback process RT2 of FIGS. 20 and 21 in accordance with a control program stored in the ROM 5A in the controller 5.

When the user operates the operation unit 3 to specify an AV content to be played back, a playback speed of the AV content, and a reverse playback operation, the controller 5 starts the reverse playback process RT2 with step SP16. In step SP17, the controller 5 performs a process step identical to step SP1 in the reverse playback process RT1 of the first embodiment of the present invention.

In step SP18, the controller 5 calculates and determines pictures to be displayed as a synthesized image top field and a synthesized image bottom field at a playback speed specified by a user and a combination of the pictures. For example, if the ×2 speed is specified, the controller 5 determines pictures P15, B13, B11, P9, B7, B5, I3, and B1 of the GOP as the top fields of the synthesized image as shown in the upper portion of FIG. 17A. The controller 5 further determines pictures B14, B12, B10, B8, B6, B4, and B2 of the GOP as synthesized image bottom fields as shown in the lower portion of FIG. 17A. A synthesized image thus results as shown in the portion (H) of FIG. 16.

In step SP19, the controller 5 calculates the MPEG stream data D1 of each playback delay shortened picture group PDS in response to a combination of one of the I picture and the P picture determined in step SP18 as being the one of the synthesized image top field and the synthesized image bottom field to be displayed, a picture needing decoding prior to a decoding process of the one of the I picture and the P picture, and the B picture referenced by the one of the I picture and the P picture, while rearranging the display order to the reverse direction.

For example, if the ×2 reverse playback speed is specified, the controller 5 calculates, as shown in a portion (B) of FIG. 16, a picture P15 of the 0th GOP(0) determined as being a P picture to be displayed, a picture B14 of the GOP displayed as a bottom field, and pictures I3, P6, P9, and P12 of the 0th GOP(0) required to decode the pictures P15 and P14 of the 0th GOP(0).

Steps SP19 through SP26, performed next by the controller 5, are respectively identical to steps SP4 through SP10 of the reverse playback process RT1 of the first embodiment of the present invention.

In step SP27, the controller 5 controls the MPEG decoding block 21 to output the baseband stream data D2 to the data selector 8 at a predetermined timing. The controller 5 controls the data selector 8 to select the picture to be displayed from the baseband stream data D2 in the display order to the display 11, and synthesizes an image from the selected pictures.

As shown in the portion (B) of FIG. 16, the picture P15 and the picture B14 of the 0th GOP(0) are selected as the pictures to be displayed from the baseband stream data D2 of the playback delay shortened picture group PDS supplied from the first MPEG decoder 21A. The picture P15 selected as a synthesized image top field and the picture B14 selected as the synthesized image bottom field are synthesized. Similarly, pictures to be displayed are successively selected from the baseband stream data D2 of the playback delay shortened picture group PDS and then synthesized. As a result, the pictures to be displayed are rearranged in the reverse display order.

Steps SP28 through SP30, performed next by the controller 5, are respectively identical to steps SP12 through SP15 in the reverse playback process RT1 of the first embodiment. If the answer to the determination in step SP30 is yes, processing proceeds to step SP31 to end the field-by-field reverse playback process RT2.

By controlling the storage unit 2, the memory controller 6, the data distributor 7, the data selector 8, and the MPEG decoding block 21, the controller 5 causes the display 11 to display a reverse playback moving image responsive to the specified AV content on a field-by-field basis at the specified speed.

The playback apparatus 20 thus results in the synthesized image by selecting the pictures so that the field intervals, each field interval between the synthesized image top field and the synthesized image bottom field are approximately equal to each other.

By adjusting the field intervals of the pictures to be displayed, the reverse playback moving image is smoothly displayed.

Time required to decode the MPEG stream data D1 of the playback delay shortened picture group PDS can be different from picture to picture. The playback apparatus 20 distributes the MPEG stream data D1 of the playback delay shortened picture group PDS among the first through sixth MPEG decoders 21A through 21F regardless of the order of the playback delay shortened picture group PDS. The efficiency of the decoding process of the MPEG stream data D1 is thus enhanced.

The pictures to be displayed are selected to generate the synthesized image in response to the playback speed so that the field intervals, each field interval between the synthesized image top field and the synthesized image bottom field are approximately equal to each other. By adjusting the field intervals of the pictures to be displayed, the reverse playback moving image is smoothly displayed. The response characteristics of the MPEG stream data are improved during the reverse playback operation. The playback apparatus displaying the smooth reverse playback moving image thus results.

Figure 22:
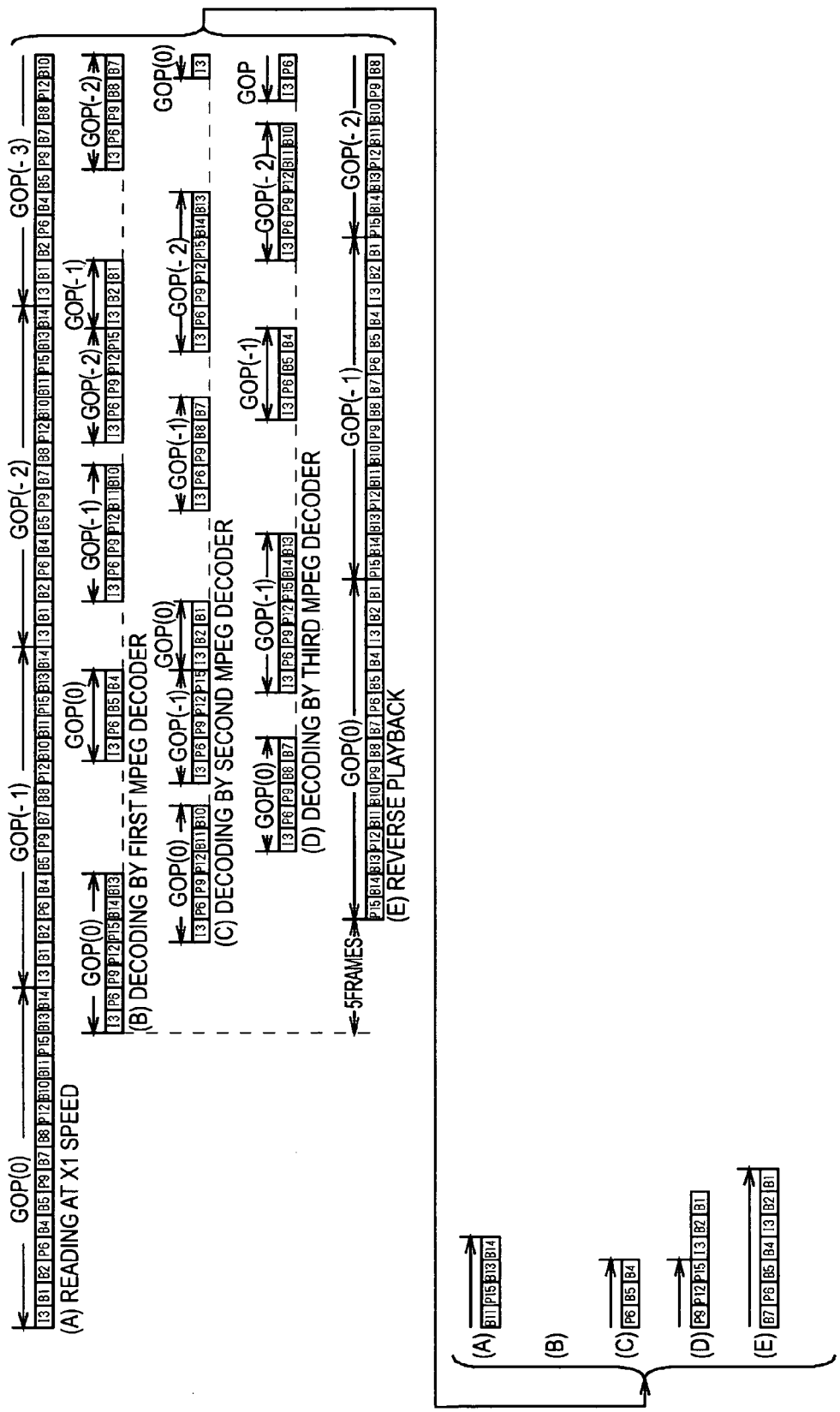
FIG. 22 is a timing diagram of a specific process of the playback apparatus during an ×1 speed playback operation in accordance with another embodiment of the present embodiment.

In the above-referenced embodiments, the data distributor 7 distributes the MPEG stream data D1 of the playback delay shortened picture group PDS among the first through fifth MPEG decoders 10A through 10E as shown in FIG. 7. The present invention is not limited to this method. As shown in FIG. 22, for example, the MPEG stream data D1 of the playback delay shortened picture group PDS may be distributed among three MPEG decoders, namely, a first MPEG decoder 10A through a third MPEG decoder 10C. The decoding process is performed with a smaller number of MPEG decoders. As long as the decoding process is completed in time, any number of MPEG decoders can be used.

Figure 23:
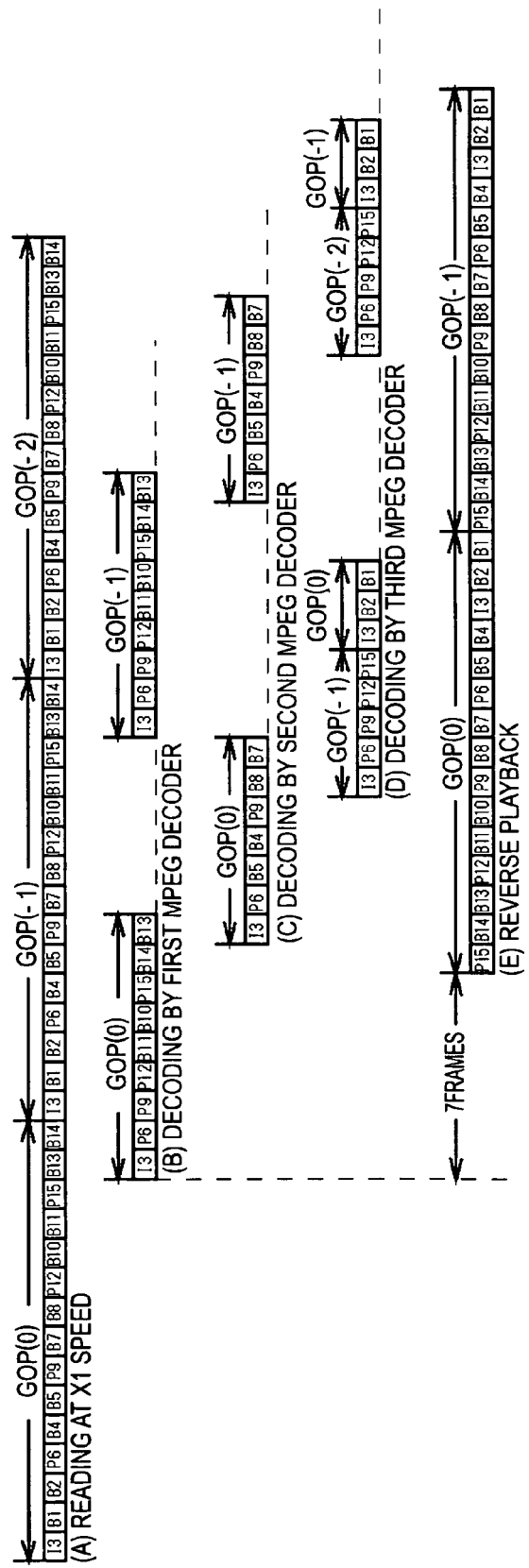
FIG. 23 is a timing diagram of a specific process of the playback apparatus during an ×1 speed playback operation in accordance with another embodiment of the present embodiment.

In the above-referenced embodiments, the data distributor 7 distributes the MPEG stream data D1 of the playback delay shortened picture group PDS among the first through fifth MPEG decoders 10A through 10E as shown in FIG. 7. The present invention is not limited to this method. For example, decoded pictures of a required number of frames may be stored in memories (not shown) in the first through fifth MPEG decoders 10A-10E, and the MPEG stream data D1 of the playback delay shortened picture group PDS may be constructed of encoded data of pictures I3, P6, P9, P12, B11, B10, P15, B14, and B13 as shown in a portion (B) of FIG. 23. In this way, a variety of combinations of one of an I picture and a P picture determined as the ones being displayed, a picture required to be decoded in the decoding process of the one of the I picture and the P picture, and a B picture referenced from the one of the I picture and the P picture is formed. Based on the number of MPEG decoders, any frame period from the start of the decoding process of a picture to the displaying of a first picture is set.

Figure 24:
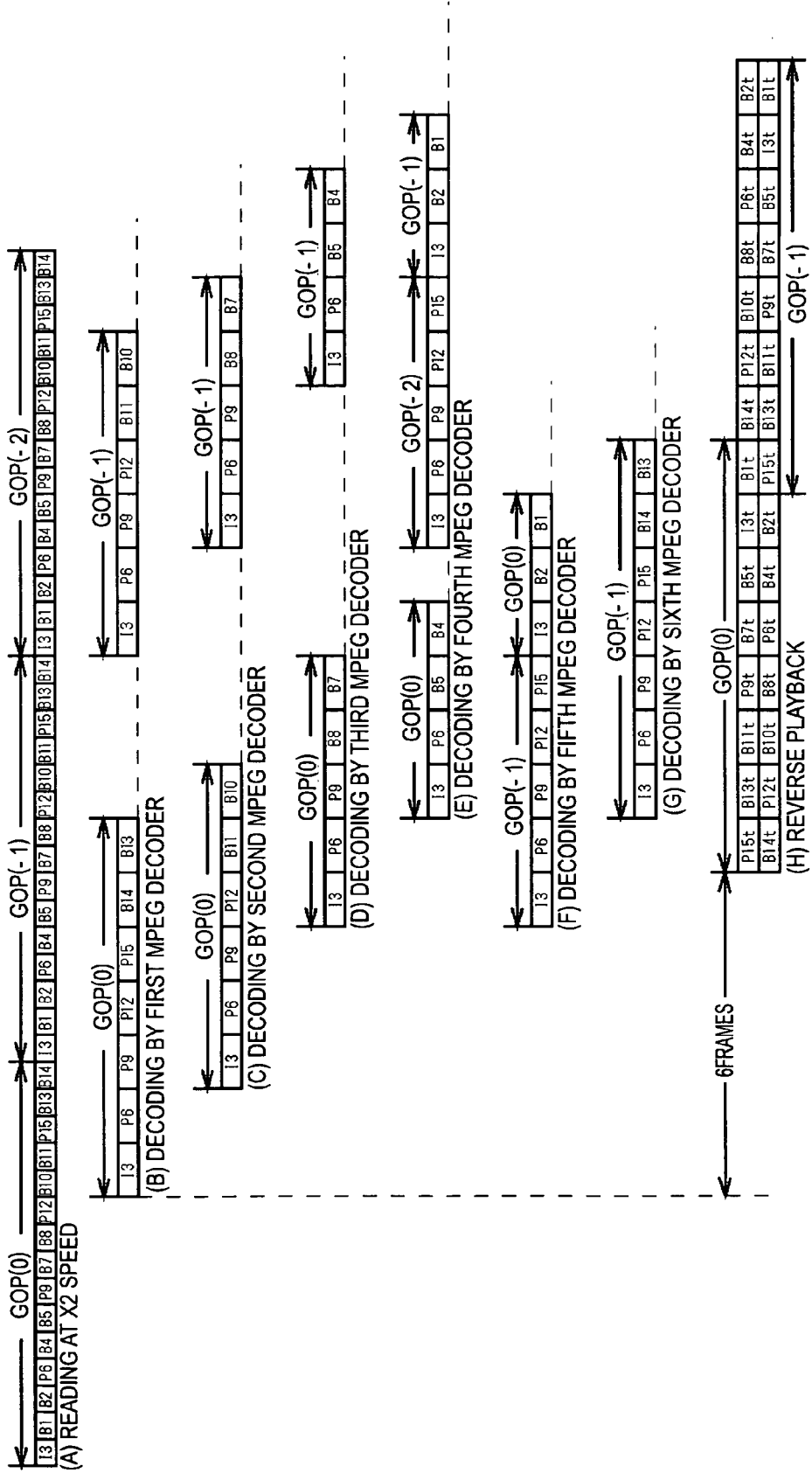
FIG. 24 is a timing diagram of a specific process of the playback apparatus during an ×2 speed playback operation in accordance with another embodiment of the present embodiment.

In accordance with the embodiments of the present invention, the in-picture bottom field of the top field data is shifted in the center of gravity to be selected as a synthesized image top field. The present invention is not limited to this method. If the in-picture top field of the top-field data is selected as a synthesized image top field as shown in a portion (H) of FIG. 24, a synthesized image bottom field is selected as previously discussed so that the field intervals between the synthesized image top fields are approximately equal to each other. The field interval of the frame images to be displayed is adjusted.

Figure 25:
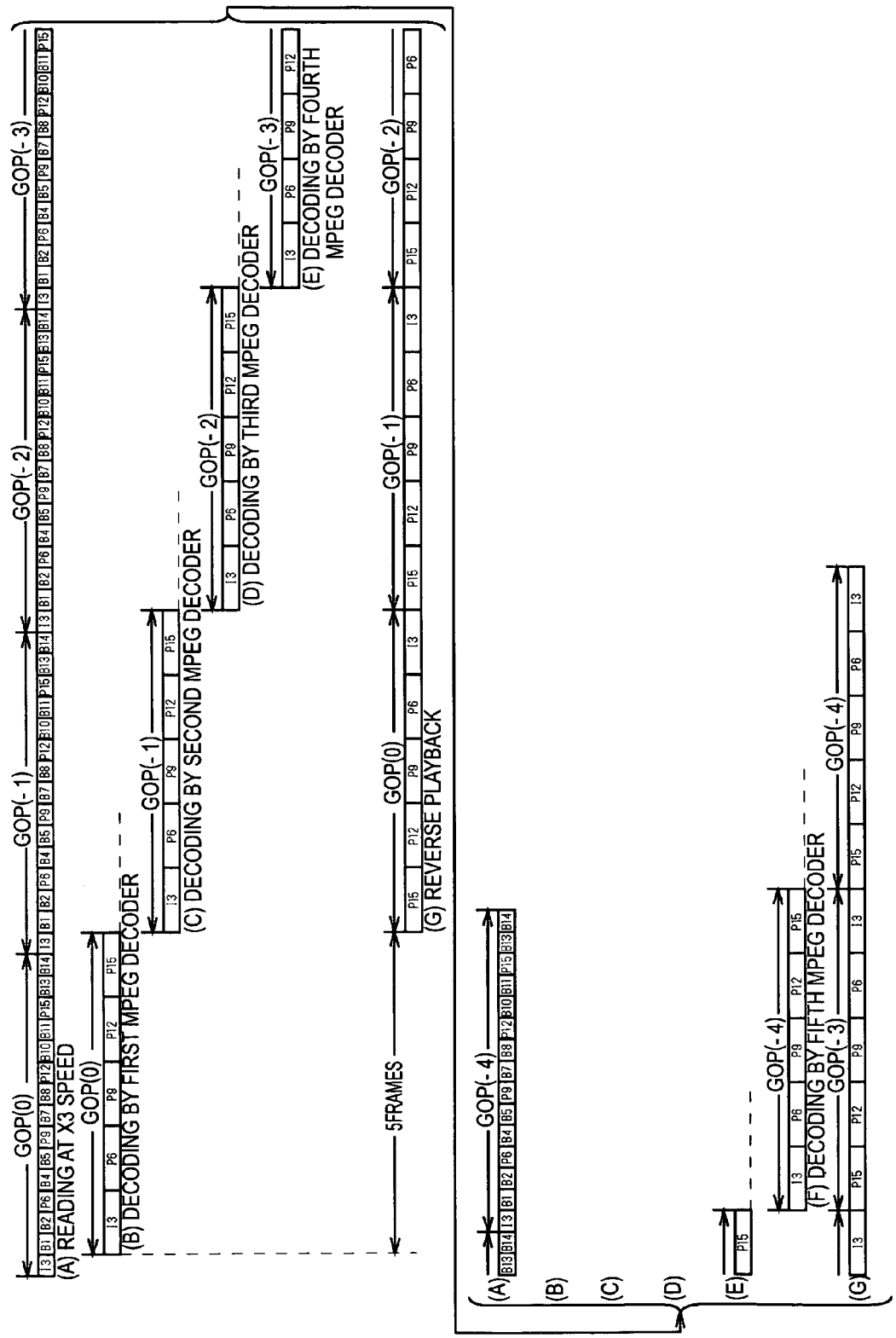
FIG. 25 is a timing diagram of a specific process of the playback apparatus during an ×3 speed playback operation in accordance with another embodiment of the present embodiment.
Figure 26:
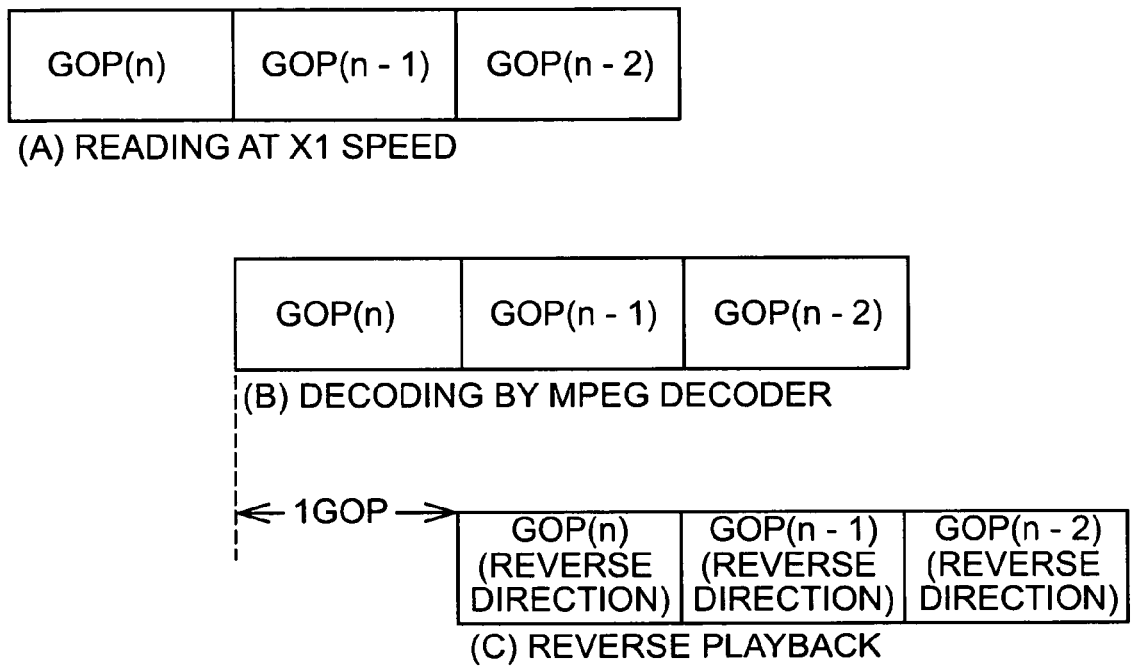
FIG. 26 illustrates an ×1 speed playback operation of a known playback apparatus.

In the above-referenced embodiments, the data distributor 7 distributes the MPEG stream data D1 of the playback delay shortened picture group PDS among the first through fifth MPEG decoders 10A through 10E as shown in FIG. 9. The present invention is not limited to this method. For example, decoded pictures of a required number of frames may be stored in memories (not shown) in the first through fifth MPEG decoders 10A-10E, and the MPEG stream data D1 of the playback delay shortened picture group PDS may be distributed among the first through fifth MPEG decoders 10A-10E as shown FIG. 25. When the picture P15 of the 0th GOP(0) is reverse played back during the ×3 reverse playback operation as shown in FIG. 9, the picture P15 of the 0th GOP(0) can be decoded only by the first MPEG decoder 10A.

In accordance with the above-referenced embodiments of the present invention, the I picture (I), the P picture (P), and the B picture (B) need the same decoding process time. In practice, the decoding process of each of the I picture and the P picture is not so long as the decoding process of the B picture. It is not necessary to synchronize the decoding process at the same timing on a frame by frame basis. The efficiency of the decoding process is improved by performing the decoding process at respective timings of the pictures.

In accordance with the above-described embodiments of the present invention, the data selector 8 does not select the picture I3 that needs to be decoded in the decoding process. The present invention is not limited to this arrangement. If the picture I3 is to be displayed, the data selector 8 may select any of the pictures I3 that need to be decoded in the decoding process. In this way, the time required to decode the picture I3 as a picture to be displayed is shortened.

In accordance with the above-described embodiments of the present invention, the GOP picture structure of the MPEG stream data has 15 for N and 3 for M. The present invention is not limited to this setting. The present invention is applicable to the MPEG stream data in another GOP picture structure.

In accordance with the above-described embodiments of the present invention, the MPEG stream data D1 of the first playback delay shortened picture group PDS is decoded by the first MPEG decoder 10A at the predetermined timing in response to the MPEG stream data read at the specified speed. The present invention is not limited to this setting. The MPEG stream data D1 of the playback delay shortened picture group PDS is decoded at any timing as long as the corresponding MPEG stream data D1 is already stored in the memory 9.

In accordance with the above-described embodiments of the present invention, the MPEG decoding block 10 includes the five MPEG decoders, namely, the first through fifth MPEG decoders 10A through 10E. The present invention is not limited to this arrangement. A circuit for decoding the MPEG stream data may be used. It is important that a mechanism for decoding a predetermined number of MPEG stream data units is used.

In accordance with the above-described embodiments of the present invention, the data distributor 7 starts with the first MPEG decoder 10A in the distribution of the MPEG stream data D1 of the playback delay shortened picture group PDS. The present invention is not limited to this setting. The data distributor 7 can start with one of the other MPEG decoders, namely, the second through fifth MPEG decoders 10B through 10E other than the first MPEG decoder 10A.

In accordance with the above-described embodiments of the present invention, the data distributor 7 successively distributes the MPEG stream data D1 of the playback delay shortened picture group PDS in the order from the first MPEG decoder 10A through the fifth MPEG decoder 10E. Alternatively, the data distributor 7 distributes the MPEG stream data D1 of the playback delay shortened picture group PDS among the first MPEG decoder 10A through the fifth MPEG decoder 10E without paying attention to the order. The data distributor 7 can distribute the MPEG stream data D1 of the playback delay shortened picture group PDS in any order.

In accordance with the above-described embodiments of the present invention, the MPEG stream data D1 of the playback delay shortened picture group PDS supplied from the data distributor 7 is successively decoded at the predetermined timing. The resulting baseband stream data D2 is supplied to the data selector 8. The present invention is not limited to this setting. The MPEG stream data D1 of the playback delay shortened picture group PDS can be decoded at the predetermined timing, and the resulting baseband stream data D2 is successively stored in memories (not shown) in the first through fifth MPEG decoders 10A through 10E. The data selector 8 reads the baseband stream data D2 from the first through fifth MPEG decoders 10A through 10E at a predetermined timing and selects the pictures to be displayed from the baseband stream data D2. The first through fifth MPEG decoders 10A through 10E can select only pictures to be displayed from the baseband stream data D2 and outputs the selected pictures to the data selector 8. Any other selection methods may be used.

In accordance with the above-described embodiments of the present invention, the playback apparatus performs the decoding process in one of the ×1, ×2, ×3, and ×5 speed reverse playback operations. The present invention is not limited to this setting. The playback apparatus can perform the decoding process at any of ×1 or higher speed reverse playback operations.

In accordance with the above-described embodiments of the present invention, the displaying starts with the picture P15 of the 0th GOP(0). The present invention is not limited to this setting. For example, the displaying can start with the picture I3 of the fifth GOP(5), the picture B7 of the (n+2)-th GOP(n+2), or any other picture at any GOP.

In accordance with the above-described embodiments of the present invention, the storage unit 2 is a hard disk device. The present invention is not limited to this arrangement. The storage unit 2 can be any type of recording media including an optical disk, a magneto-optic disk, a semiconductor memory, and a magnetic disk.

In accordance with the above-described embodiments of the present invention, each of the storage unit 2 and the display 11 is connected to the playback apparatus via a cable or the like. The present invention is not limited to this arrangement. Each of the storage unit 2 and the display 11 can be linked to the playback apparatus by a wired fashion, a wireless fashion, or any other connection means.

In accordance with the above-described embodiments of the present invention, the above-references series of steps can be performed by hardware. The present invention is not limited to this arrangement. The process steps can be performed by software. If the series of steps is performed by software, a program forming the software is installed from a recording medium or via a network onto a computer incorporated into a hardware structure or to a general-purpose computer, for example. Such recording media includes an optical disk, a magneto-optical disk, a semiconductor memory, a magnetic disk, etc. The program can be installed onto the general-purpose computer. via a network such as the Internet.

In accordance with the above-described embodiments of the present invention, the decoding control block 4 and the MPEG decoding block 10 are not necessarily mounted on the same extension card, such as a peripheral component interconnect (PCI) card or a PCI-EXPRESS card. If the use of the PCI-EXPRESS technology achieves a high data rate between cards, the decoding control block 4 and the MPEG decoding block 10 can be mounted on separate cards. The functions of the controller 5 (for example, issuing compressed data read command) are performed in whole or in part by a CPU generally controlling the entire system (for example, the main CPU of a personal computer).

It should be understood by those skilled in the art that various modifications, combinations, sub-combinations and alterations may occur depending on design requirements and other factors insofar as they are within the scope of the appended claims or the equivalents thereof.

What is claimed is:

1. A decode control apparatus for decoding encoded data and generating reverse playback image data, the apparatus comprising:
    means for controlling the reading of the encoded data at a specified playback speed;
    means for generating, from the encoded data read under the control of the read control means, a plurality of shortened encoded data groups;
    means for distributing the plurality of shortened encoded data groups among a plurality of decoders operable to provide decoding of the plurality of shortened encoded data groups at the specified playback speed; and
    means for generating the reverse playback image data responsive to the specified playback speed based on the decoding of the plurality of shortened encoded data groups by the plurality of decoders, the means for generating the reverse playback image data selecting a plurality of pictures from within each of the plurality of shortened encoded data groups,
    wherein the encoded data is read on a basis of a predetermined group having a predetermined number of image frames,
    wherein a number of image frames included in each shortened encoded data group is less than that that of the predetermined group,
    wherein each shortened encoded data group includes two types of image frames: a first type of image frame are to be selected to generate the reverse playback image; and a second type of image frames are required ones during a decoding of the first type of image frames, and
    wherein the plurality of pictures from within each of the plurality of shortened encoded data groups are selected based on the specific playback speed set from among a plurality of playback speeds.

2. The decode control apparatus according to claim 1, wherein the plurality of shortened encoded data groups comprise:
    a first shortened encoded data group decoded at a first timing corresponding to reading a first picture from within the encoded data; and
    at least one second encoded data group decoded at a second timing corresponding to decoding a second picture from within the first shortened encoded data group;
    wherein the first timing occurs one or more picture frames prior to the second timing.

3. The decode control apparatus according to claim 1, further comprising storage means for storing the encoded data read under the control of the read control means, and wherein the means for generating generates the plurality of shortened encoded data groups from the encoded data stored in the storage means.

4. The decode control apparatus according to claim 1, wherein the means for generating generates the reverse playback image data by synthesizing each of the plurality of shortened encoded data groups on a field-by-field basis.

5. A decode control apparatus for decoding encoded data and generating reverse playback image data, the apparatus comprising:
    means for controlling the reading of the encoded data at a specified playback speed;
    means for generating, from the encoded data read under the control of the read control means, a plurality of shortened encoded data groups;
    means for distributing the plurality of shortened encoded data groups among a plurality of decoders operable to provide decoding of the plurality of shortened encoded data groups at the specified playback speed; and
    means for generating the reverse playback image data responsive to the specified playback speed, based on the decoding the plurality of shortened encoded data groups by the plurality of decoders;
    wherein the means for generating generates the reverse playback image data by synthesizing each of the plurality of shortened encoded data groups on a field-by-field basis, and
    wherein the means for generating generates the reverse playback image data in a manner such that a top field of the reverse playback image data and a bottom field of the reverse playback image data is synthesized, wherein a field interval between the top field and the bottom field are approximately equal to each other.

6. A decode control method for decoding encoded data and generating reverse playback image data, the method comprising the steps of:
    reading, under the control of a controller, the encoded data at a specified playback speed;
    generating, utilizing a generator unit, from the encoded read data, a plurality of shortened encoded data groups;
    distributing, utilizing a distributing unit, the plurality of shortened encoded data groups among a plurality of decoders for providing decoding of the plurality of shortened encoded data groups at the specified playback speed; and
    generating the reverse playback image data responsive to the specified playback speed based on the decoding the plurality of shortened encoded data groups by the plurality of decoders, the generating the reverse playback image data selecting a plurality of pictures from within each of the plurality of shortened encoded data groups,
    wherein the encoded data is read on a basis of a predetermined group having a predetermined number of image frames,
    wherein a number of image frames included in each shortened encoded data group is less than that that of the predetermined group,
    wherein each shortened encoded data group includes two types of image frames: a first type of image frame are to be selected to generate the reverse playback image; and a second type of image frames are required ones during a decoding of the first type of image frames, and
    wherein the plurality of pictures from within each of the plurality of shortened encoded data groups are selected based on the specific playback speed set from among a plurality of playback speeds.

7. A non-transitory computer-readable recording medium for storing a computer program for decoding encoded data and generating reverse playback image data, wherein the computer program comprises:

controlling the reading of the encoded data at a specified playback speed;
generating, from the encoded data read under the control of the read control, a plurality of shortened encoded data groups;
distributing the plurality of shortened encoded data groups among a plurality of decoders for providing decoding of the plurality of shortened encoded data groups at the specified playback speed; and
generating the reverse playback image data responsive to the specified playback speed based on the decoding the plurality of shortened encoded data groups by the plurality of decoders, the generating the reverse playback image data selecting a plurality of pictures from within each of the plurality of shortened encoded data groups,
wherein the encoded data is read on a basis of a predetermined group having a predetermined number of image frames,
wherein a number of image frames included in each shortened encoded data group is less than that that of the predetermined group,
wherein each shortened encoded data group includes two types of image frames: a first type of image frame are to be selected to generate the reverse playback image; and a second type of image frames are required ones during a decoding of the first type of image frames, and
wherein the plurality of pictures from within each of the plurality of shortened encoded data groups are selected based on the specific playback speed set from among a plurality of playback speeds.

8. A decode control apparatus for decoding encoded data and generating reverse playback image data, the apparatus comprising:

a controller controlling the reading of the encoded data at a specified playback speed;
a generator generating, from the encoded data read under the control of the read controller, a plurality of shortened encoded data groups;
a distributor distributing the plurality of shortened encoded data groups among a plurality of decoders operable to provide decoding of the plurality of shortened encoded data groups at the specified playback speed; and
a generator generating the reverse playback image data responsive to the specified playback speed based on the decoding the plurality of shortened encoded data groups by the plurality of decoders, the generator generating the reverse playback image data by selecting a plurality of pictures from within each of the plurality of shortened encoded data groups,
wherein the encoded data is read on a basis of a predetermined group having a predetermined number of image frames,
wherein a number of image frames included in each shortened encoded data group is less than that that of the predetermined group,
wherein each shortened encoded data group includes two types of image frames: a first type of image frame are to be selected to generate the reverse playback image; and a second type of image frames are required ones during a decoding of the first type of image frames, and
wherein the plurality of pictures from within each of the plurality of shortened encoded data groups are selected based on the specific playback speed set from among a plurality of playback speeds.

* * * * *